(12) United States Patent
Fukunaga et al.

(10) Patent No.: US 7,749,591 B2
(45) Date of Patent: Jul. 6, 2010

(54) LAMINATED SHEET

(75) Inventors: Masaaki Fukunaga, Tokyo (JP); Atsushi Suzuki, Tokyo (JP); Tamijiro Kaneyuki, Tokyo (JP); Kouichiro Hiroshige, Tokyo (JP); Hiroshi Kohama, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 612 days.

(21) Appl. No.: 11/576,242

(22) PCT Filed: Sep. 27, 2005

(86) PCT No.: PCT/JP2005/017721

§ 371 (c)(1),
(2), (4) Date: May 1, 2007

(87) PCT Pub. No.: WO2006/035761

PCT Pub. Date: Apr. 6, 2006

(65) Prior Publication Data

US 2007/0292665 A1    Dec. 20, 2007

(30) Foreign Application Priority Data

Sep. 30, 2004    (JP)    ............... 2004-285677

(51) Int. Cl.
*B32B 5/16*    (2006.01)
(52) U.S. Cl. .................. 428/206; 428/211.1; 428/220; 428/325; 428/327; 428/500; 428/501; 428/688; 428/913.3
(58) Field of Classification Search ............. 428/206, 428/211.1, 220, 325, 327, 500, 501, 688, 428/913.3
See application file for complete search history.

(56) References Cited

U.S. PATENT DOCUMENTS 5,500,457 A * 3/1996 Sarkar et al. ............... 523/201

FOREIGN PATENT DOCUMENTS

| JP | 02-033399 | 2/1990 |
|---|---|---|
| JP | 05-216322 | 8/1993 |
| JP | 06-324509 | 11/1994 |
| JP | 08-286414 | 11/1996 |
| JP | 09-255004 | 9/1997 |
| JP | 10-018197 | 1/1998 |
| JP | 10-090933 | 4/1998 |
| JP | 10-254162 | 9/1998 |
| JP | 10-509253 | 9/1998 |
| JP | 10-510062 | 9/1998 |
| JP | 11-200284 | 7/1999 |
| JP | 11-207882 | * 8/1999 |
| JP | 11-350380 | 12/1999 |
| JP | 2001-022111 | 1/2001 |
| JP | 2001-201884 | 7/2001 |
| JP | 2002-023407 | 1/2002 |
| JP | 2002-091049 | 3/2002 |
| JP | 2002-258508 | 9/2002 |
| JP | 2003-096694 | 4/2003 |
| JP | 2003-096695 | 4/2003 |
| JP | 2003-103714 | 4/2003 |
| JP | 2003-156866 | 5/2003 |
| JP | 2003-171893 | 6/2003 |
| JP | 2004-093955 | 3/2004 |
| JP | 2004-101980 | 4/2004 |
| JP | 2004-138997 | 5/2004 |
| JP | 2004-163676 | 6/2004 |
| JP | 2004-198965 | 7/2004 |
| WO | WO 96/16120 | * 5/1996 |
| WO | WO 98/03730 | 1/1998 |

* cited by examiner

*Primary Examiner*—Betelhem Shewareged
(74) *Attorney, Agent, or Firm*—Knobbe Martens Olson & Bear LLP

(57) ABSTRACT

The present invention relates a laminated sheet having improved toner-fixing property and toner blocking resistance, that comprises a base material made of paper, one or more thermoplastic resin layer(s) provided on one side or both sides of said base material, a toner-fixing layer provided thereon, wherein two or more hydrophilic macromolecular substances each having a different glass transition temperature are used as binders and constitutes said toner-fixing layer, at least a hydrophilic macromolecular substance (A) having a glass transition temperature of 50° C. or above and a hydrophilic macromolecular substance (B) having a glass transition temperature of 50° C. or below are contained as said hydrophilic macromolecular substances therein.

19 Claims, No Drawings

LAMINATED SHEET

This application is the U.S. National Phase under 35 U.S.C. §371 of International Application PCT/JP2005/017721, filed Sep. 27, 2005, which claims priority to Japanese Patent Application No. 2004-285677, filed Sep. 30, 2004. The International Application is published under PCT Article 21(2) in a language other than English.

TECHNICAL FIELD

The present invention relates to a laminated sheet constituted by a base material made of paper and a thermoplastic resin layer provided on the base material, and particularly to a recording sheet used in connection with the electronic photograph printing method.

PRIOR ART

Normally paper is used as the material for electronic photograph recording sheets. If water resistance is required, so-called "synthetic paper" and "laminated paper" are used. Patent Literature 1 (Japanese Patent No. 2763011) proposed by the applicant describes a laminated paper produced by laminating a thermoplastic resin on one side or both sides of a base material by means of the extrusion lamination method or co-extrusion lamination method, among others, where the thermoplastic resin layer constituting the outermost layer contains an inorganic filler by 20 to 80 percent by weight so as to provide printability with printing ink and writability with water-based ink.

In addition, a technique is known whereby an image-receiving layer comprising inorganic filler and binder is provided on the surface of an electronic photograph recording sheet constituted by a water-resistant processed sheet or polyolefin film, in order to increase transferability or adhesion of toner (Patent Literature 2: Japanese Patent Laid-open No. 2003-156866). Patent Literature 3 (Japanese Patent Laid-open No. Hei 6-324509) describes a technique to improve blocking resistance on unrecorded paper during storage.

Patent Literature 4 (Japanese Patent Laid-open No. Hei 09-255004) discloses a sheet made by laminating a thermoplastic resin by one or more layers on each side of a paper in such a way that the outermost resin layer on one side has a melting point at least 20° C. higher than the melting point of the outermost resin layer on the other side, where such sheet can be used as a header label sheet.

Patent Literature 5 (Japanese Patent Laid-open No. Hei 05-216322) discloses a method to fix toner on the surface by means of secondary heat treatment, wherein specifically, color toner attached to a transparent resin layer on a transfer target is heated using a belt-type transfer body moving to below a member having a built-in heat source to melt the toner into the transparent resin layer, after which the layer is cooled and then the transfer target is separated from the belt-type transfer body to form a color image.

Patent Literature 6 (Japanese Patent Laid-open No. Hei 11-207882) describes a method to produce a multi-layer film by means of the co-extrusion lamination method, in which two or more extruders are used to guide each thermoplastic resin to a T die in molten state and then extrude all thermoplastic resins from the respective T dies simultaneously to produce laminated layers and bond them together.

Patent Literature 7 (International Patent Laid-open No. WO98/03730), Patent Literature 8 (Japanese Patent Laid-open No. Hei 11-200284), Patent Literature 9 (Japanese Patent Laid-open No. Hei 11-350380), Patent Literature 10 (Japanese Patent Laid-open No. 2003-96694) and Patent Literature 11 (Japanese Patent Laid-open No. 2003-96695), among others, disclose organic compounds having the effect of inhibiting inter-fiber bond in pulp.

Patent Literature 12 (Japanese Patent Laid-open No. 2003-103714), relating to a water-resistant sheet proposed by the applicant, discloses an invention that realizes a high-quality print surface by providing a toner-fixing layer containing a macromolecular silicone with an average molecular weight of 600,000 to 900,000 and causing the macromolecular silicone to bleed onto the surface during printing so as to add friction resistance to the ink surface.

Patent Literature 13 (Japanese Patent Laid-open No. 2002-91049) describes an electronic photograph recording sheet comprising a base material layer constituted by a water-resistant processed paper or polyolefin, with the surface of the base material layer laminated with a recording layer constituted by a synthetic resin film containing fine inorganic powder.

Patent Literature 1: Japanese Patent No. 2763011
Patent Literature 2: Japanese Patent Laid-open No. 2003-156866
Patent Literature 3: Japanese Patent Laid-open No. Hei 6-324509
Patent Literature 4: Japanese Patent Laid-open No. Hei 09-255004
Patent Literature 5: Japanese Patent Laid-open No. Hei 05-216322
Patent Literature 6: Japanese Patent Laid-open No. Hei 11-207882
Patent Literature 7: International Patent Laid-open No. WO98/03730
Patent Literature 8: Japanese Patent Laid-open No. Hei 11-200284
Patent Literature 9: Japanese Patent Laid-open No. Hei 11-350380
Patent Literature 10: Japanese Patent Laid-open No. 2003-96694
Patent Literature 11: Japanese Patent Laid-open No. 2003-96695
Patent Literature 12: Japanese Patent Laid-open No. 2003-103714
Patent Literature 13: Japanese Patent Laid-open No. 2002-91049

SUMMARY OF THE INVENTION

Problems to Be Solved by the Invention (Toner-Fixing Property, Toner Blocking Resistance)
(1) Under the electronic photograph printing method, latent image toner is transferred onto a recording sheet and the recording sheet is passed between heating rolls that have been heated to approx. 200° C. to cause thermal fusion and thereby fix the toner. If a paper-based recording sheet is used, molten toner sinks into the voids between paper fibers and gets fixed favorably. If a laminated sheet having a thermoplastic resin laminated on its surface is used, however, there are less surface irregularities compared to paper surface and therefore toner-fixing property is reduced, and for this reason it is effective to provide a toner-fixing layer on top of the thermoplastic resin layer. Even if a toner-fixing layer is provided, however, the resulting toner-fixing property is still lower than what would be achieved if the layer below the toner-fixing layer were a paper instead of a thermoplastic resin layer, and it is also difficult to form such toner-fixing layer to begin with. Furthermore, depending on the printing condition a printed recording sheet ejected from a recording device such as a laser beam printer (LBP) is not given enough time to cool to let the toner fix before the next recording sheet is ejected and placed on top of the previous recording sheet. If a large number of sheets are printed, stacked recording sheets maintain high temperature within the sheets and this high temperature, combined with the weight of recording sheets, increases the adhesion, and thereby causes fusion, between the toner on the surface of a recording sheet and the back side of another recording sheet on top and directly contacting the toner of the sheet below. This phenomenon is called "toner blocking." When one tries to separate printed recording sheets by fanning, toner separates from the printed surface due to toner blocking.

In particular, this phenomenon presents a problem for laminated sheets and other sheets having a thermoplastic resin layer that does not release heat easily. For example, Patent Literature 3 mentions blocking resistance as a problem in preserving white paper, but it does not mention any technique to improve toner blocking resistance.

One object of the present invention is to provide a laminated sheet suitable for use with the electronic photograph printing method, offering excellent film formation property on the toner-fixing layer, achieving good toner-fixing property and print quality, and also preventing toner blocking.

(Sheet Transferability)

(2) Recent years have seen new printers that adopt a mechanism designed to prevent toner from attaching to heating rolls and other fixing devices by using toner that contains release oil. If any of these printers is used to print a sheet having high gloss and high smoothness, the adhesion between sheet surface and heating roll surface becomes higher than when a normal sheet is printed, and consequently the high-gloss, high-smoothness sheet often fails to separate from the heating roll and gets stuck to the roll, thereby causing sheet jamming. Another problem is that a higher friction coefficient between sheets often causes two or more sheets to be fed simultaneously.

In view of the aforementioned problems, one object of the present invention is to provide a laminated sheet offering good separability from heating rolls as well as excellent sheet transferability.

(Property to Prevent Fusion with Heating Rolls, and Internal Adhesion)

(3) Under the aforementioned electronic photograph printing method, latent image toner is transferred onto a recording sheet and fixed by means of thermal fusion. Since a recording sheet is passed between heating rolls that have been heated to approx. 200° C., use of a paper-based recording sheet causes the water content in the paper to evaporate as a result of heating by the heating rolls. On the other hand, use of a laminated sheet comprising a base material and a thermoplastic resin layer laminated on each side of the base material results in entrapment by the thermoplastic resin layer of evaporating water content and this trapped water sometimes pushes up the thermoplastic resin laminated on the base material surface to eventually generate voids (non-adhered parts) called "blisters" in some areas between the base material and the thermoplastic resin layer that must essentially be adhered to each other in an inseparable manner over the entire surface.

In addition, if a laminated sheet jams up when it is being passed between heating rolls in a manner contacting the heating rolls, the resin layer laminated on the surface may fuse with the heating rolls. Furthermore, in cases where there are two or more thermoplastic resin layers, insufficient adhesion between the resin layers tends to cause separation between the resin layers, in which case the sheet gets stuck to the heating rolls more easily.

In light of the above, one object of the present invention is to provide a laminated sheet comprising a base material laminated with a thermoplastic resin, offering improved heat resistance and adhesion within the laminated sheet, while also preventing the surface resin from being fused with heating rolls even if, during recording by the electronic photograph printing method, the sheet jams up when it is being passed between the heating rolls in a manner contacting the heating rolls.

(Gloss, Image Clarity)

(4) Water-proof laminated sheets are used for commercial posters as well as in POP (Point Of Purchase) advertising of products we often see in convenience stores and supermarkets. With posters and product POP advertising, exterior look is critical. For this reason, sheets having not only high gloss but also high image clarity and esthetically pleasing mirror-like surface texture are favored in these applications. With conventional laminated sheets, a cooling roll having a mirror-finished periphery is used in the process of pressure-bonding the molten thermoplastic resin with the base material so that the mirror surface of the cooling roll is transferred onto the thermoplastic resin surface to add high gloss. However, high-gloss laminated sheets produced in this way have minute dents scattered over the surface, which affects the image clarity, or esthetically pleasing look. One object of the present invention is to provide a laminated sheet offering high gloss as well as esthetically very pleasing look.

Another problem with conventional laminated sheets is that when they are recorded under the electronic photograph printing method, the thermoplastic resin layer becomes soft as the sheet passes through the heating rolls, and the surface texture of the heating roll is transferred onto the softened resin, thereby affecting the surface property of the sheet and reducing its gloss and esthetically pleasing look. Many copiers and laser printers based on the electronic photograph printing method use high-temperature heating rolls and similar fixing devices, and therefore adopt a mechanism to apply release oil to the heating rolls to prevent toner from attaching to the rolls. If these copiers and laser printers are used to print laminated sheets, not only the sheet surface changes due to high temperature, but also the release oil migrates to the sheet surface via the heating rolls. As a result, gloss drops dramatically after printing. To address these problems, one object of the present invention is to provide a laminated sheet capable of maintaining high gloss after printing.

(Water Resistance on Cut Surface)

(5) In addition, another object of the present invention is to provide a laminated sheet offering excellent water resistance on cut surface, because resistance to water entering from cut surface is important in certain applications where the sheet frequently comes in contact with water, such as posters and flower tags used in outdoor locations subject to rain.

(Writability)

(6) Laminated sheets having a thermoplastic resin layer on their surface provide lower writability compared to normal papers. Particularly when they are used with a printer whose heating rolls are coated with silicone to prevent molten toner from attaching to the heating rolls, the silicone migrates to the paper surface and reduces writability after printing. As a means to solve this problem, a method to provide the surface with a coating layer containing fine inorganic powder is proposed, as described in Patent Literature 13 mentioned above. While this method improves writability after printing, however, it makes fogging (a condition in which toner scatters over and stains white areas) occur easily.

In view of the above, one object of the present invention is to provide a laminated sheet offering good writability after printing, while minimizing fogging, when information is recorded on the sheet based on the electronic photograph printing method.

Objects of the present invention are listed below. Here, all variations of the present invention, pertaining to all claims covered in the present application for patent, do not satisfy all of these objects. Instead, the constitution described in claim 1 is considered as the base and constitutions described in the remaining claims are used as qualifiers or additions to achieve the respective objects.

An object of the present invention is to obtain a laminated sheet having a toner-fixing layer offering good film formation property.

Another object of the present invention is to provide a laminated sheet offering excellent toner-fixing property.

Another object of the present invention is to provide a laminated sheet offering excellent print quality.

Another object of the present invention is to provide a laminated sheet offering improved toner blocking resistance.

Another object of the present invention is to provide a laminated sheet offering good sheet transferability during printing using an electronic photograph printing device.

Another object of the present invention is to provide a laminated sheet that prevents fusion with heating rolls during printing using an electronic photograph printing device.

Another object of the present invention is to provide a laminated sheet offering good adhesion between the resin layers or between a resin layer and the base material.

Another object of the present invention is to provide a high-gloss, esthetically pleasing laminated sheet, or a laminated sheet whose gloss and esthetically pleasing look are not affected after electronic photograph printing.

Another object of the present invention is to provide a laminated sheet offering improved water resistance on cut surface.

Another object of the present invention is to provide a laminated sheet offering improved writability after printing.

In addition to the foregoing, yet another object of the present invention is to provide a laminated sheet that has a thermoplastic resin layer or toner-fixing layer but is still lightweight.

Another object of the present invention is to provide a laminated sheet offering any one of different surface properties such as glossy, semi-glossy and matte. Another object of the present invention is to provide a method of producing a laminated sheet in which multiple thermoplastic resin layers are laminated on a base material.

Means for Solving the Problems

The present application for patent relates to an invention that solves the aforementioned problems mainly by means of the following constitutions:
(1) A laminated sheet comprising a base material made of paper and one or more thermoplastic resin layers provided on one side or both sides of the base material, as well as a toner-fixing layer provided on top; the laminated sheet characterized in that two or more hydrophilic macromolecular substances each having a different glass transition temperature are used as binders for the toner-fixing layer, and at least a hydrophilic macromolecular substance (A) having a glass transition temperature of 50° C. or above and a hydrophilic macromolecular substance (B) having a glass transition temperature of 50° C. or below are contained as the hydrophilic macromolecular substances.
(2) A laminated sheet according to (1), characterized in that the hydrophilic macromolecular substance (A) is a hydrophilic macromolecular substance having a glass transition temperature of 80° C. or above.
(3) A laminated sheet according to (1) or (2), characterized in that the hydrophilic macromolecular substances (A) and (B) are contained at the ratio of (A)/(B)=80/20 to 30/70.
(4) A laminated sheet according to any one of (1) to (3), characterized in that the hydrophilic macromolecular substances (A) and (B) are acrylic polymers.
(5) A laminated sheet according to (4), characterized in that the hydrophilic macromolecular substances (A) and (B) are acrylic polymers and these acrylic polymer hydrophilic macromolecular substances (A) and (B) form a core-shell structure by constituting a core and a shell, respectively.
(6) A laminated sheet according to any one of (1) to (5), characterized in that among the one or more thermoplastic resin layers, the outermost thermoplastic resin layer is constituted by a thermoplastic resin with a melting point of 180° C. or above.
(7) A laminated sheet according to (6), characterized in that the thermoplastic resin with a melting point of 180° C. or above is a polymethyl pentene.
(8) A laminated sheet according to any one of (1) to (7), characterized in that the number of the one or more thermoplastic resin layers is at least two and the thermoplastic resin layer contacting the base material is a linear low-density polyethylene layer synthesized with single-site catalyst.
(9) A laminated sheet according to any one of (1) to (7), characterized in that the number of the one or more thermoplastic resin layers is at least two and the thermoplastic resin layer contacting the base material contains at least a linear low-density polyethylene layer synthesized with single-site catalyst and a layer next to such layer constituted by a modified polyolefin or ionomer or a mixture thereof with a thermoplastic resin with a melting point of 180° C. or above.
(10) A laminated sheet according to (9), characterized in that the modified polyolefin is a maleic acid anhydride modified polyolefin.
(11) A laminated sheet according to any one of (1) to (10), characterized in that the base material has a surface roughness Rz of 5.0 μm or below.
(12) A laminated sheet according to (11), characterized in that the base material is a cast coat paper having a cast coat layer mainly constituted by pigment and adhesive and provided on a base paper.
(13) A laminated sheet according to (12), characterized in that the cast coat paper is made by using a heated mirror-finished surface to pressure-bond a cast coat layer provided on a base paper while the cast coat layer is still wet, and then drying the pressure-bonded cast coat layer, and the cast coat layer contains kaolin by 50 parts or more by weight relative to 100 parts by weight of inorganic pigments, where the kaolin has a grain size distribution such that grains with a size of 0.4 to 4.2 μm account for 65% or more by volume, and also contains plastic pigments.

(14) A laminated sheet according to (13), characterized in that the base paper contains an organic compound having the effect of inhibiting inter-fiber bond in pulp.

(15) A laminated sheet according to any one of (1) to (14), characterized in that the toner-fixing layer contains a macromolecular silicone with an average molecular weight of 600,000 to 900,000.

(16) A laminated sheet according to any one of (1) to (15), characterized in that its 75° gloss under ISO (8254-1) is 80% or above and image clarity as measured in accordance with JIS K-7105 is 50% or above.

(17) A laminated sheet according to any one of (1) to (15), characterized in that the toner-fixing layer contains an inorganic filler, and the laminated sheet surface has a smoothness of 200 seconds or more and surface electrical resistivity of $5\times10^8$ to $1\times10^{11}$.

(18) A laminated sheet according to any one of (1) to (17), characterized in that the laminated sheet is a recording sheet for electronic photograph printing.

(19) A method of producing a laminated sheet which comprises a base material made of paper and a thermoplastic resin layer provided on one side or both sides of the base material, wherein the thermoplastic resin layer on at least one side contains a layer contacting the base material and is constituted by a linear low-density polyethylene synthesized with single-site catalyst, a thermoplastic resin layer with a melting point of 200° C. or above as the outermost layer, and a layer contacting the outermost layer and constituted by at least one of modified polyolefin or ionomer; the method of producing a laminated sheet characterized by laminating the resins constituting these layers onto the base material by means of the co-extrusion method.

EFFECTS OF THE INVENTION

A laminated sheet obtained in accordance with the present invention offers a toner-fixing layer with good film formation property.

In addition, a laminated sheet obtained in accordance with the present invention offers excellent toner-fixing property.

In addition, a laminated sheet obtained in accordance with the present invention offers excellent print quality.

In addition, a laminated sheet obtained in accordance with the present invention offers excellent toner blocking resistance.

In addition, a laminated sheet obtained in accordance with the present invention offers good sheet transferability during printing using an electronic photograph printing device.

In addition, a laminated sheet obtained in accordance with the present invention does not cause fusion with heating rolls during printing using an electronic photograph printing device.

In addition, a laminated sheet obtained in accordance with the present invention offers good adhesion between the resin layers or between a resin layer and the base material.

In addition, a laminated sheet obtained in accordance with the present invention offers high gloss and esthetically pleasing look and the gloss and esthetically pleasing look are not reduced after printing.

In addition, a laminated sheet obtained in accordance with the present invention offers excellent water resistance on cut surface.

In addition, a laminated sheet obtained in accordance with the present invention offers excellent writability after printing.

In addition, a laminated sheet having a thermoplastic resin layer and toner-fixing layer obtained in accordance with the present invention is very lightweight.

In addition, a laminated sheet obtained in accordance with the present invention is a type of laminated sheet offering any one of different surface properties such as glossy, semi-glossy and matte.

In addition, a method of forming multiple thermoplastic resin layers on a base material according to the present invention offers an excellent ability to form each resin layer, etc., with a very small thickness.

A laminated sheet obtained in accordance with the present invention provides, in particular, improved toner blocking resistance by means of combining a hydrophilic macromolecular substance with a high glass transition temperature (Tg) of 80° C. or above with a hydrophilic macromolecular substance with a low Tg of 50° C. or below. In particular, it is more effective to add, as a binder for toner-fixing layer, a hydrophilic macromolecular substance with a high glass transition temperature (Tg) by at least 30 percent by weight. Since a hydrophilic macromolecular substance with a low Tg improves film formation property, setting a specific blending ratio of the two achieves both of the benefits mentioned above. When a film constituting the toner-fixing layer is formed, the high-Tg hydrophilic macromolecular substance exists in the low-Tg hydrophilic macromolecular substance, not in a molten state but in a condition maintaining its granular shape, thereby forming a so-called "island structure," and when toner is fixed using heating rolls of approx. 200° C., the high-Tg hydrophilic macromolecular substance melts and causes very strong adhesion between the toner-fixing layer and toner to embody good toner-fixing property. Once toner is fixed, the high-Tg hydrophilic macromolecular substance quickly becomes a glass state, which also helps improve toner-fixing property because of the anchoring effect of toner that has entered the voids between grains of high-Tg hydrophilic macromolecular substance. Similarly, existence of the high-Tg hydrophilic macromolecular substance increases separability from hot transfer rolls such as fixing rolls, which in turn improves transferability.

BEST MODE FOR CARRYING OUT THE INVENTION

The present invention provides a laminated sheet comprising a paper-type base material, a thermoplastic resin layer provided on the surface of the base material to add water resistance, and a toner-fixing layer mainly constituted by hydrophilic macromolecular substances to improve printing performance. This laminated sheet is particularly suitable for printing and recording by means of the electronic photograph printing method using a laser beam printer, etc. In addition, this laminated sheet is also suitable for printing images, such as printing the entire surface in color.

[1. Toner-Fixing Layer]

According to the present invention, the toner-fixing layer is provided as the uppermost layer of the laminated sheet in the form of a coating layer on which information is recorded by the electronic photograph printing method.

According to the present invention, the toner-fixing layer contains, as binders, two types of hydrophilic thermoplastic emulsions each having a different glass transition temperature (Tg), to provide good film formation property and toner-fixing property on the toner-fixing layer, as well as improved toner blocking resistance after printing. Use of a high-Tg hydrophilic macromolecular substance alone presents problems in terms of film formation property and toner-fixing property on the toner-fixing layer. A low-Tg hydrophilic macromolecular substance melts at low temperature and therefore is easy to form in film state, and it also makes the hard toner-fixing layer softer to provide good adhesion with toner. However, use of a low-Tg hydrophilic macromolecular substance alone causes the toner-fixing layer to become sticky and eventually stick to other sheets, thereby resulting in blocking during storage of white sheets as well as toner blocking after printing. The present invention uses two types of hydrophilic macromolecular substances each having a different Tg to solve the aforementioned problems.

To be specific, a thermoplastic resin layer is formed on a base material made of paper, etc., and then a toner-fixing layer containing, as binders, two types of hydrophilic macromolecular substances each having a different Tg is provided on top of the thermoplastic resin layer to achieve a laminated sheet.

[1.1 Binder]

Two or more hydrophilic macromolecular substances each having a different glass transition temperature are used as binders constituting the toner-fixing layer, wherein these hydrophilic macromolecular substances include at least a hydrophilic macromolecular substance (A) having a glass transition temperature of 50° C. or above and a hydrophilic macromolecular substance (B) having a glass transition temperature of 50° C. or below.

As for the hydrophilic macromolecular substance (A) having a glass transition temperature of 50° C. or above, a hydrophilic macromolecular substance with a glass transition temperature of 80° C. or above is particularly favorable from the viewpoint of providing toner blocking resistance. 50° C. represents a temperature at which the toner-fixing layer can maintain good film formation property, while 80° C. is close to the sheet temperature when the sheet is ejected after printing. Preferably, (A) should have a glass transition temperature of at least 90° C. which is higher than the temperature of the printed sheet when ejected, while (B) should have a glass transition temperature not exceeding 40° C. which corresponds to the film forming temperature. It is desirable that hydrophilic macromolecular substances should be emulsions having hydrophilic functional groups. In the present invention, the term "hydrophilic" refers to a condition in which a resin is dispersed or dissolved and remains stable in a medium comprising water or a mixture of water and a small amount of organic solvent. These resins are dispersed or dissolved as grains in a coating solution, but when the coating solution is applied and dried, these substances form a film to produce a toner-fixing layer. The drying process is implemented using a dryer normally at a temperature of 40° C. or above. Since a binder becomes film when heated to temperatures above its Tg, it is important to contain, as a constituent binder, a substance whose Tg is equal to or below the temperature reached during drying.

Examples of hydrophilic macromolecular substances include homopolymers or copolymers having styrene, butadiene, various acrylates, acrylonitrile, ethylene, propylene, vinyl acetate, vinyl chloride, etc., as a monomer, and/or their modified variations, which may be used alone or mixed with polyester resins, urethane resins, epoxy resins, etc. These hydrophilic macromolecular substances should desirably be polymers with an average molecular weight of 100,000 or more, produced by a known traditional polymerization method such as emulsion polymerization, soap-free emulsion polymerization or suspension polymerization. Among others, acrylic polymers can be used favorably as they benefit toner-fixing property. Examples of acrylic polymers include ester polyacrylate, ester polymethacrylate, styrene-ester acrylate copolymer and styrene-ester methacrylate copolymer.

It is desirable that both hydrophilic macromolecular substances (A) and (B) are acrylic polymers. In particular, if the hydrophilic macromolecular substances (A) and (B) form a core-shell structure by serving as a core and a shell, respectively, a single combined substance exhibits two functions. This is favorable because ease of operation also improves.

To be specific, the acrylic polymers having a core-shell structure should preferably be a core having a glass transition temperature of 50° C. or above and a shell having a glass transition temperature of 50° C. or below, or a shell having a glass transition temperature of 50° C. or above and a core having a glass transition temperature of 50° C. or below, or more preferably they should be a core having a glass transition temperature of 80° C. or above and a shell having a glass transition temperature of 50° C. or below, or a shell having a glass transition temperature of 80° C. or above and a core having a glass transition temperature of 50° C. or below, where the former constitution in which the core is the hydrophilic macromolecular substance (A) and the shell is the hydrophilic macromolecular substance (B) is more preferable because it provides good film formation property and can easily achieve a strong toner-fixing layer. Acrylic polymers having such core-shell structure can be produced, for example, by the method described in Japanese Patent Laid-open No. 2001-323004. In this case, the shell is not formed as a film covering the core, but it exists as something like a protective colloid surrounding the core.

The ratio of hydrophilic macromolecular substances (A)/(B) should be in a range of 80/20 to 5/95. In particular, a ratio (A)/(B) of 80/20 to 30/70 is preferable. An excessive percentage of (A) reduces film formation property and toner-fixing property, while an excessive percentage of (B) causes toner blocking. Therefore, it is important to achieve a good balance of the two, and in this sense a ratio (A)/(B) of 65/35 to 45/55 is more preferable.

[1.2 Forming Method]

Various known methods can be used to form a toner-fixing layer. For example, a coating material containing the aforementioned binders is applied on the surface of the thermoplastic resin layer provided on top of the base material, using a known application method such as an air-knife coater, blade coater, roll coater, curtain coater, gravure coater, die coater or bar coater. The coating weight is not specifically limited, as long as it is in a range of 0.5 to 7.5 $g/m^2$ (dry weight), or more preferably in a range of 1 to 5 $g/m^2$ (dry weight). If the coating weight is less than 0.5 $g/m^2$ (dry weight), adding sufficient toner-fixing property and writability after printing becomes difficult. If the coating weight exceeds 7.5 $g/m^2$ (dry weight), on the other hand, the toner-fixing layer may detach from the thermoplastic resin layer surface. Also, this toner-fixing layer should desirably use a water-based coating material to protect the operator against potential health problems and also to reduce the environmental impact. At this time, it is desirable that the thermoplastic resin layer surface be given corona treatment, etc., to facilitate formation of the toner-fixing layer.

Also, the toner-fixing layer may use, as binders, known hydrophilic macromolecular substances, etc., other than those mentioned above, as long as use of such other hydrophilic macromolecular substances, etc., does not affect the effects of the present invention. In addition, although ideally no pigments should be contained from the viewpoint of ensuring good sheet transferability, pigments can be used to reduce roll adhesion during printing, in which case silica may be considered as a candidate pigment, among others. To reduce the impact on gloss that tends to decrease when pigments are used, the pigment content should be limited to around 5 parts by weight relative to 100 parts by weight of binders.

In addition to the above, lubricants, crosslinking agents, adhesive-strength improving agents, defoaming agents, coating-property improving agents, viscosity-enhancing agents, antistatic agents, UV-absorbing agents and dyes may be added, among others. Particularly when the sheet is used as a recording sheet subject to manipulation by the electronic photograph printing method, it is desirable that an antistatic agent be contained.

[1.3 Addition of Silicone]

According to the present invention, a macromolecular silicone is added to the toner-fixing layer to enhance toner-fixing property. Addition of a macromolecular silicone also helps provide a laminated sheet capable of maintaining high gloss and esthetically very pleasing look after electronic photograph printing, while also offering excellent separability from heating rolls as well as sheet transferability.

Under the electronic photograph printing method, latent image toner is transferred onto a recording sheet and fixed by means of thermal fusion, and in this process a recording sheet is passed between heating rolls that have been heated to approx. 200° C. This heat damages the surface of the toner-fixing layer, while release oil is also transferred from the heating rolls to the sheet surface. If the sheet surface does not react well to release oil, release oil remains as fine drops on the sheet surface, which reduces the gloss of the sheet. On the other hand, the present invention provides on top of the sheet surface a toner-fixing layer containing a macromolecular silicone, in order to allow the sheet surface to better react to release oil by causing the release oil to spread over the sheet surface in the form of a thin film. This suppresses drop in gloss after printing. Furthermore, blending of a macromolecular silicone also enhances separability from heating rolls and also improves sheet transferability by preventing multiple sheets from being fed simultaneously.

A macromolecular silicone used in accordance with the present invention should preferably have an average molecular weight in a range of 600,000 to 900,000, and among macromolecular silicones meeting this condition, polyalkyl siloxane is particularly favorable. The content should not be more than around 5 percent by weight in solid content with respect to binders.

By using a macromolecular silicone, the present invention can provide a laminated sheet with esthetically pleasing finish that maintains high gloss and surface texture even when printed using a copier or laser printer based on the electronic photograph printing method in which a mechanism to apply release oil to heating rolls is adopted to prevent toner from attaching to the heating rolls and other fixing devices. Such laminated sheet provides a very high practical value, as it is suitable for posters and various other applications that require high gloss and esthetically pleasing look.

In other words, the effects listed below can be mainly achieved.

(1) prop in gloss is prevented and high gloss is maintained after printing.
(2) The sheet does not easily stick to the heating rolls, etc., during printing, which reduces occurrence of various printing problems.
(3) A sheet that ensures good printing finish can be provided.
(4) The sheet is suitable for display in outdoor locations and other places where it easily comes in contact with water.
(5) Use of a toner-fixing layer containing high-Tg and low-Tg hydrophilic macromolecular substances enhances toner-fixing property while reducing toner blocking, and further addition of a macromolecular silicone allows a high-quality water-resistant sheet offering high gloss and enhanced properties such as toner-fixing property to be printed without problem.

[2. Thermoplastic Resin Layer]

According to the present invention, one or more thermoplastic resin layers are formed on one side or both sides of the base material. This thermoplastic resin layer adds surface water resistance and gloss to the base material, and also ensures high-temperature resistance and transferability in electronic photograph printing devices. Also, the thermoplastic resin layer must satisfy the required adhesion performance with respect to the toner-fixing layer formed on the base material or on its own surface. In addition, in many cases two or more thermoplastic resin layers are provided, and therefore the formation method for thermoplastic resin layer must be such that it can form a thin film and satisfy other requirements such as film formation property.

[2.1 Types of Thermoplastic Resins]

Thermoplastic resins that can be used in accordance with the present invention include polypropylene, polyethylene, polystyrene, polyethylene terephthalate, polybutylene terephthalate, polymethyl pentene and other resins that can be laminated. These thermoplastic resins may be used alone in a single layer or multiple resins may be used in multiple layers.

[2.1.1 Outermost Layer]

If a laminated sheet obtained in accordance with the present invention is used for recording in connection with the electronic photograph printing method, it is desirable to use a thermoplastic resin having a high melting point of approx. 180° C. or above in order to prevent the thermoplastic resin from deforming when toner is heated and fused with the sheet, which is a common mechanism employed by devices based on the electronic photograph printing method. By providing an outermost layer constituted by such resin, fusion with heating rolls can be prevented. In addition, surface properties are not affected after recording, and high gloss and esthetically pleasing surface texture can be maintained.

Among thermoplastic resins having a melting point of 180° C. or above, polymethyl pentene resins, polyamide resins and polyester resins (such as polyethylene terephthalate, polybutylene terephthalate and aliphatic polyester) can be used favorably. In particular, polymethyl pentene is most preferable. Polymethyl pentene is a crystal olefin polymer whose main ingredient is 4-methyl pentene-1. It has a melting point of 220 to 240° C. and offers excellent heat resistance. Titanium oxide, calcium carbonate or other white inorganic pigment may be added to the outermost thermoplastic resin layer to provide opacity, writability, and so on. The content of inorganic pigments should preferably be 25 percent by weight or less, or more preferably be 15 percent by weight or less, with respect to the outermost layer to which the pigments are added. If the pigment content is greater than the above levels, surface properties of the laminated sheet, such as smoothness and gloss, may be affected. Inorganic pigments should desirably have a grain size of 0.1 to 20 μm.

[2.1.2 Intermediate Layer]

If adhesion is poor between the thermoplastic resin constituting the aforementioned outermost layer and the base material, or between the thermoplastic resin layers when two or more thermoplastic resin layers are provided, an adhesive layer may be coated or laminated onto the base material in advance, or alternatively the thermoplastic resin used for the outermost layer or any other layer may be laminated with an adhesive layer by means of co-extrusion. This adhesive layer should also be a type of thermoplastic resin, and an acrylic resin or epoxy resin is used as its material, among others.

Particularly when a thermoplastic resin with a melting point of 180° C. or above is used as the outermost layer, it is desirable that a thermoplastic resin having adhesive property be laminated immediately below the outermost layer as an intermediate layer to enhance the adhesion between the base material or outermost layer and the thermoplastic resin layer, etc., laminated underneath. If the base material is a coat paper or when other thermoplastic resin layer is present below the outermost layer, the outermost layer tends to separate easily. Therefore, a material offering good adhesion with both the outermost layer and base material, or with the thermoplastic resin layer positioned below the outermost layer, should be selected. In particular, the aforementioned polymethyl pentene resins naturally have releasing property, and accordingly the adhesive resin should also exhibit strong adhesive property with respect to these polymethyl pentene resins. For your information, polymethyl pentene resins provide good adhesion with high-grade papers, but their adhesion with coat papers and other resin layers is poor. In this sense, too, it is preferable to dispose such adhesive resin layer in between.

Resins having adhesive property include resin compositions, etc., constituted by modified polyolefin, ionomer or a mixture thereof with a thermoplastic resin having a melting point of 180° C. or above. One or more layers constituted by the same material or different materials may be placed in layers.

Examples of modified polyolefin include, but are not limited to, a homopolymer or copolymer of α-olefin with a carbon number of 2 to 20, modified by grafting a monomer that has a polar group or double ethylene bonds. According to the present invention, maleic acid anhydride modified polyethylene is used favorably, because it provides good adhesive property with respect to polymethyl pentene resins.

Example of homopolymers or copolymers include low-density polyethylene, medium-density polyethylene, high-density polyethylene, linear low-density polyethylene, ultra-low-density linear polyethylene, polypropylene, ethylene-pentene-1 copolymer, ethylene-4-methyl pentene-1 copolymer, and ethylene-butene-1 copolymer. These homopolymers or copolymers normally have a melt flow rate in a range of 0.1 to 30 g/10 min, or in many cases in a range of 1 to 20 g/10 min, as measured in accordance with ASTM-D-1238, while their melting point as measured in accordance with ASTM-D-2117 is normally in a range of 50 to 170° C., or in many cases in a range of 80 to 150° C. Their density as measured in accordance with ASTM-D-1505 is normally in a range of 0.88 to 0.96 g/m$^3$, or in many cases in a range of 0.89 to 0.96 g/m$^3$.

Examples of monomers having a polar group or ethylene double bonds that can be used as modifiers for homopolymers or copolymers include (meth)acrylic acid, tetrahydro phthalic acid, maleic acid, itaconic acid, citraconic acid, fumaric acid, crotonic acid, norbornene dicarboxylic acid, end-cis-bicyclo [2,2,1]hept-5-en-2,3-dicarboxylic acid (Nadic™ acid), end-cis-bicyclo [2,2,1]hept-5-en-2-methyl-2,3-dicarboxylic acid (methyl Nadic™ acid) and other carbonic acids; maleic acid anhydride, itaconic acid anhydride, citraconic acid anhydride, fumaric acid anhydride, crotonic acid anhydride, norbornene dicarboxylic acid anhydride, end-cis-bicyclo [2,2,1] hept-5-en-2,3-dicarboxylic acid (Nadic™ acid) anhydride, end-cis-bicyclo [2,2,1]hept-5-en-2-methyl-2,3-dicarboxylic acid (methyl Nadic™ acid) anhydride and other carbonic acid anhydrides; alkyl ester of (meth)acrylic acid, (mono or di)alkyl ester of tetrahydro phthalic acid, (mono or di)alkyl ester of maleic acid, (mono or di)alkyl ester of itaconic acid, (mono or di)alkyl ester of citraconic acid, (mono or di)alkyl ester of fumaric acid, (mono or di)alkyl ester of crotonic acid, (mono or di)alkyl ester of norbornene dicarboxylic acid, alkyl ester of end-cis-bicyclo [2,2,1]hept-5-en-2,3-dicarboxylic acid (Nadic™ acid), alkyl ester of end-cis-bicyclo [2,2,1] hept-5-en-2-methyl-2,3-dicarboxylic acid (methyl Nadic™ acid) and other esters; hydroxy ethyl(meth)acrylate, 2-hydroxy propyl(meth)acrylate, 3-hydroxy propyl (meth)acrylate, 2-hydroxy-3-phenoxy-propyl(meth)acrylate, 3-chloro-2-hydroxy propyl (meth)acrylate, glycerin mono(meth) acrylate, pentaerythritol mono(meth)acrylate, trimethylol propane mono(meth)acrylate, tetramethylol ethane mono (meth)acrylate, butane diol mono(meth)acrylate, polyethylene glycol mono(meth)acrylate, 2-(6-hydroxy hexanoyl oxy) ethyl acrylate and other hydroxy ester (meth)acrylates; 10-undecene-1-ol, 1-octene-3-ol, 2-methanol norbornene, hydroxy styrene, hydroxy ethyl vinyl ether, hydroxy butyl vinyl ether, N-methylol acrylic amid, 2-(meth)acryloyl oxy ethyl acid phosphate, glycerin monoaryl ether, aryl alcohol, aryloxy ethanol, 2-butene-1,4-diol, glycerin monoalcohol and other compounds containing hydroxy group; glycidyl (meth)acrylate, (mono or di)glycidyl ester of itaconic acid, (mono or di)glycidyl ester of butene tricarboxylic acid, (mono or di)glycidyl ester of citraconic acid, (mono or di)glycidyl ester of end-cis-bicyclo [2,2,1]hept-5-en-2,3-dicarboxylic acid (Nadic™ acid), (mono or di)glycidyl ester of end-cis-bicyclo [2,2,1]hept-5-en-2-methyl-2,3-dicarboxylic acid (methyl Nadic™ acid), (mono or di)glycidyl ester of aryl succinic acid, glycidyl ester of p-styrene carbonic acid, aryl glycidyl ether, 2-methyl aryl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinyl cyclohexene monoxide and other epoxy compounds containing unsaturated ethylene bond; amino ethyl acrylate, amino ethyl propyl acrylate, dimethyl amino ethyl methacrylate, amino propyl acrylate, phenyl amino ethyl methacrylate, cyclohexyl amino ethyl methacrylate, methacryloyl oxy ethyl acid phosphate monomethanol amino half sol and other alkyl amino ester (meth)acrylates; N-vinyl diethyl amine, N-acetyl vinyl amine and other vinyl amines; aryl amine, methacryl amine, N-methyl acryl amine, N,N-dimethyl acryl amide, N,N-dimethyl amino propyl acryl amide and other aryl amines; acryl amide, N-methyl acryl amide and other acryl amides; p-amino styrene and other amino styrene compounds; and 6-amino hexyl imide succinate, 2-amino ethyl imide succinate and other amino alkyl imide succinates. These modifiers may be used alone or two or more modifies may be combined as long as such combination does not affect the characteristics of the modifiers. Among these modifiers, (meth)acrylic acid, maleic acid, fumaric acid and maleic acid anhydride can be used favorably.

Ionomer is an ion-containing polymer which is partially or completely neutralized with a metallic ion or quaternary ammonium, and in particular an ionomer produced by grafting a small amount of (meth)acrylic acid to an ethylene polymer chain and then neutralizing a part of the (meth)acrylic acid with Na+, K+, Zn++, Mg++, etc., can be used favorably. Among others, an ionomer containing Zn is preferable as it contributes to good gloss.

These ethylene ionomer resins are ethylene/α,β-unsaturated carbonic acid co-polymer (I), or ethylene/α,β-unsaturated carbonic acid/α,β-unsaturated carbonic acid ester copolymer (II), where a part of carbonic acid groups, or normally 5 to 80%, is neutralized with a metallic ion. Before neutralization, a unit of ethylene accounts for normally approx. 75 to 99.5 mol %, or preferably 88 to 98 mol %, of the ethylene copolymer component of (I) or (II) above. A unit of α,β-unsaturated carbonic acid accounts for normally approx. 0.5 to 15 mol %, or preferably 1 to 6 mol %, while a unit of α,β-unsaturated carbonic acid ester accounts for normally approx. 0 to 10 mol %, or preferably 0 to 6 mol %. In addition, the percentage of carbonic acid groups neutralized with a metallic ion to the carbonic acid groups in the copolymer of (I) or (II) above (=neutralization level) is normally 5 to 80%, or preferably 10 to 75%.

Also, the aforementioned resin composition constituted by a mixture of a modified polyolefin or ionomer with a thermoplastic resin with a melting point of 180° C. or above may be produced by co-extrusion, or extrusion after mixing, of a modified polyolefin and a thermoplastic resin with a melting point of 180° C. or above, or of an ionomer and a thermoplastic resin with a melting point of 180° C. or above.

[2.1.2 Layer on Base Material Side]

According to the present invention, it is desirable that a linear low-density polyethylene layer synthesized with single-site catalyst (SS-LLDPE) be provided as a layer contacting the base material, because such layer provides good adhesion with the base material. In particular, providing this layer is effective when a coat paper is used as the base material. SS-LLDPE is synthesized with a single-site catalyst having a uniform activation point, so it demonstrates a sharper molecular weight distribution than a linear low-density polyethylene synthesized with general-purpose Ziegler catalyst (LLDPE). Metallocene catalyst is a representative form of single-site catalyst. This catalyst has a structure in which two cyclopentadiene rings sandwich atoms of titanium, zirconium, hafnium, vanadium, niobium, tantalum, chromium, molybdenum, tungsten or other transition metal. For your reference, synthesis of LLDPE with a single-site catalyst may be implemented by any vapor-phase method, high-pressure method or solution method.

[2.1.3 Other Thermoplastic Resin Layers]

According to the present invention, thermoplastic resin layers may be provided as deemed appropriate in addition to the thermoplastic resin layers mentioned above. Thermoplastic resins that constitute such other layers are not specifically limited, and examples include polypropylene, polyethylene, polystyrene, polyethylene terephthalate, polybutylene terephthalate, polymethyl pentene and other resins that can be laminated.

[2.2 Constitution of Other Side]

The side of the base material opposite to the one on which the aforementioned thermoplastic resin layer is formed may be arbitrary, meaning that it may remain exposed, be coated with an adhesive, or be laminated with a thermoplastic resin layer, depending on the purpose. If a thermoplastic resin layer exists on both sides of the base material, the types, layer order and other specifics of the thermoplastic resin layers on one side may be the same as or different from those on the other side.

If the obtained sheet is used in connection with the electronic photograph printing method, the back side of the base material should desirably have an outermost thermoplastic resin layer with a melting point of 180° C. or above, just like on the top side of the base material. If used in connection with the electronic photograph printing method, the laminated sheet passes between a heating roll and a nip roll, with the recording side contacting the heating roll. Since the nip roll has also been heated to the same temperature as the heating roll due to the effect of the heating roll, providing the non-recording side with an outermost layer constituted by a thermoplastic resin with a melting point of 180° C. or above prevents fusion with the roll more effectively.

[2.3 Method of Forming Thermoplastic Resin Layer]

<Lamination Method>

Various methods that can be used to laminate a thermoplastic resin layer on the base material include, in addition to the extrusion lamination method and co-extrusion lamination method, the wet lamination method, dry lamination method and other methods used to attach a film onto the base material. However, the wet lamination method, while capable of processing one side of the base material, is not suitable for attaching a film on both sides of the base material, because since the back side of the base material is covered with film, the water content evaporating from the base material when the solvent is dried has nowhere to go. As a result, the vapor expands and pushes up the film, thereby allowing voids (non-adhered parts) called "blisters" to generate easily. Under the dry lamination method, the base film does not adhere securely to the film, and the heat from the heating rolls used to fix toner during printing or recording by the electronic photograph printing method causes the water content in the base material to evaporate. The vapor expands and allows blisters to generate easily, which then makes further processing of the sheet difficult. Therefore, use of the extrusion lamination method or co-extrusion lamination method is desired if the laminated sheet obtained in accordance with the present invention is used for printing or recording based on the electronic photograph printing method.

Of the two methods, the co-extrusion lamination method, in which two or more extruders are used to guide each thermoplastic resin to a T die in molten state and then extrude all thermoplastic resins from the respective T dies simultaneously to produce laminated layers and bond them together, is more suitable from the viewpoints of adhesion between thermoplastic resin layers as well as production efficiency. As explained above, the co-extrusion lamination method is characterized by use of two or more extruders to guide each thermoplastic resin to a T die in molten state and then extrude all thermoplastic resins from the respective T dies simultaneously to produce laminated layers and bond them together. This method is also known as a method of producing a multi-layer film, etc., as described in Japanese Patent Laid-open No. Hei 11-207882, among others. Suitable T dies include single T dies and co-extrusion T dies. If co-extrusion T dies are used, two or more resins can be extruded simultaneously, which is ideal in cases where two or more layers are laminated on the base material. Co-extrusion T dies are classified into the inner-die adhesion type and outer-die adhesion type. Of the two types, inner-die adhesion co-extrusion T dies provide excellent utility in that they allow two or more resins to be laminated simultaneously under different temperature conditions.

In applications where exterior appearance is important and high gloss is required, extrusion lamination or co-extrusion lamination should be implemented using a cooling roll that has a mirror-finished periphery and is designed to come in contact with molten resin, as well as a nip roll with greater hardness, to press the resin and base material, etc., at a high line pressure to pressure-bond them together, because this way, the surface of the laminated resin exhibits high gloss. For this purpose, it is desirable that the aforementioned pressing and pressure-bonding be performed using a nip roll with a hardness of 80 degrees (JIS K-6253) or above, and at a line pressure of 15 kgf/cm or above.

As mentioned above, lamination property may drop if an inorganic filler such as titanium oxide is added to the outermost layer for the purpose of adding opacity, etc. In this case, the resin containing the inorganic filler may be co-extruded and laminated with a resin not containing inorganic filler, so as to prevent the occurrence of various problems such as so-called "broken film" even when the thickness of resin layer is reduced, and therefore stability of layering operation is ensured.

<Layer Thickness>

The thickness of each thermoplastic resin layer or overall thickness of all thermoplastic resin layers should be in a range of 10 to 80 μm, or preferably in a range of 15 to 40 μm, on each side. If the overall thickness of resin layers is too small, formation of each layer becomes difficult under the extrusion lamination method or co-extrusion lamination method. If the overall thickness is too large, manufacturing cost increases and static electricity generates more easily. If the overall thickness must be increased, therefore, it is desirable to use a conducting agent or take other appropriate measure.

Particularly when the obtained sheet is used in connection with the electronic photograph printing method, the thickness of the outermost layer should be 2 to 30 μm, or preferably be 10 to 20 μm. If the outermost layer is too thin and there is only one thermoplastic resin layer, insufficient adhesive strength with respect to the base material may result in blisters. If there are two or more layers, insufficient heat resistance increases the chances of the sheet fusing with the heating roll when the sheet jams up at the heating roll. On the other hand, a thickness of approx. 30 μm allows the effects of the present invention to be achieved sufficiently. Although the outermost layer may be made thicker, such increased thickness does not justify the higher cost.

Also, another layer constituted by a thermoplastic resin with a melting point of 180° C. or above may be provided in addition to the outermost layer. If such other layer contacts the outermost layer, however, it is appropriate to keep the total thickness within the ranges mentioned above. If an adhesive resin layer is provided below the outermost layer, its thickness should be 2 to 20 μm, or preferably 3 to 10 μm. The layer constituted by SS-LLDPE, etc., provided directly in contact with the base material, should have a thickness of 10 to 70 μm, or preferably 10 to 25 μm.

<Others>

Various additives may be added or coating materials may be applied on the outermost layer and other thermoplastic resin layers, in addition to the specific applications mentioned above, as long as they do not affect the objects of the present invention. For example, these additives and coating materials that can be added or applied to the outermost layer and other thermoplastic resin layers include generally used additives and coating materials such as anti-blocking agents (acrylic bead, glass bead, silica, etc.), agents to fix toner during recording, and agents that enhance adhesive strength.

[2.4 Reference Test (1)—Adhesion Between Base Material and Resin Layer]

The following presents reference test examples for evaluating the adhesion between the thermoplastic resin layers or between a thermoplastic resin layer and the base material. Using as samples the laminated sheets obtained by the reference test examples and reference comparative examples, condition of sticking to the heating roll as well as adhesion between the thermoplastic resin layers and between a thermoplastic resin layer and the base material were evaluated using the methods described below. For your reference, condition of sticking to the heating roll reveals the degree of fusion with the thermoplastic resin layer. Table 1 shows the constitutions of layers used in respective reference test examples and reference comparative examples, while Tables 2 and 3 show the evaluation results of respective reference test examples and reference comparative examples.

<Condition of Sticking to Heating Roll>

One hundred sample sheets were printed continuously using a LBP "DocuPrint C3530" manufactured by Fuji Xerox Co., Ltd., and whether the thermoplastic resin laminated on the base material would melt and stick to the heating roll was visually inspected and evaluated based on the criteria specified below. The print text conformed to the test print pattern supplied with the LBP:

⊚: The sheet did not stick to the heating roll at all.

○: The sheet curled slightly, but it did not stick to the heating roll at all.

Δ: The heat stuck to the heating roll slightly, but it did not cause any problem that would negatively affect practical application.

x: The sheet stuck to the heating roll frequently and printing had to be stopped each time.

<Separation Between Thermoplastic Resin Layers>

A piece of double-sided adhesive tape was attached to a metal plate. Next, a sample of 1.5 cm in width and 7 cm in length was cut out, and the back side of the base material constituting the sample (side not laminated with any thermoplastic resin) was attached to the double-sided adhesive tape on the metal plate. Then, a piece of clear adhesive tape (trade name: Cellotape (registered trademark)) manufactured by Nichiban Co., Ltd. was firmly attached to the surface of the outermost thermoplastic resin layer, after which the clear adhesive tape was peeled off with a strong force to evaluate the result visually based on the following criteria:

⊚: No thermoplastic resin attached to the sticky surface of the tape, with the tape maintaining stickiness and the thermoplastic resin layers still firmly adhered to each other.

○: Some thermoplastic resin attached to the sticky surface of the tape. Although some thermoplastic resin remained on the base material and there was some separation between the thermoplastic resin layers, there was still strong resistance against separation and the thermoplastic resin layers were adhered to each other to a degree not causing any problem that would negatively affect practical application.

Δ: Some thermoplastic resin attached to the sticky surface of the tape. Some thermoplastic resin also remained on the base material and there was some separation between the thermoplastic resin layers. Although there was some resistance against separation, the thermoplastic resin layers were not fully adhered to each other and this created problems that would negatively affect practical application.

x: The thermoplastic resin layers separated from each other easily and did not remain adhered sufficiently.

<Adhesion with Base Material>

A test was conducted in the same manner as explained above, and the adhesion between the base material and the thermoplastic resin layer on top was visually evaluated based on the following criteria:

⊚: The two did not separate and maintained good adhesion.

○: The two separated slightly, but there was no problem that would negatively affect practical application.

Δ: The two easily separated and exhibited poor adhesion.

x: The two completely lost adhesion with each other.

<75° Gloss>

Measurement was taken using a gloss meter GM-26PRO manufactured by Murakami Color Research Laboratory Co., Ltd., in accordance with ISO 8254-1.

REFERENCE TEST EXAMPLE 1

Using a commercially available cast coat paper (CLC Cast manufactured by Nippon Paper Industries Co., Ltd.) as the base material, 100 parts by weight of a polymethyl pentene resin (melting point 234° C., TPX DX820 manufactured by Mitsui Chemicals, Inc.) as the outermost layer, 100 parts by weight of a maleic acid anhydrate modified polyolefin (Admer SE800 manufactured by Mitsui Chemicals, Inc.) as the adhesive resin layer directly below the outermost layer (hereinafter referred to as "intermediate layer"), and 100 parts by weight of a linear low-density polyethylene synthesized with single-site catalyst (KC650T manufactured by Japan Polyethylene Corporation) as the layer on base material side, were co-extruded and laminated at 320° C. to make a structure comprising three different layers. The thicknesses of laminated resins were 5, 5 and 30 μm in the order of outermost layer, intermediate layer and layer on base material side.

REFERENCE TEST EXAMPLE 2

A sample was obtained in the same manner as in Reference Test Example 1, except that the base material was changed to a high-grade paper.

REFERENCE TEST EXAMPLE 3

A sample was obtained in the same manner as in Reference Test Example 1, except that the base material was changed to a coat paper (NPi Coat manufactured by Nippon Paper Industries Co., Ltd.).

REFERENCE TEST EXAMPLE 4

A sample was obtained in the same manner as in Reference Test Example 1, except that 100 parts by weight of an ionomer resin made from ethylene-methacrylate copolymer crosslinked with Zn (Himilan 1702 manufactured by DuPont-Mitsui Polychemicals Co., Ltd.) were used as the intermediate adhesive resin layer.

REFERENCE TEXT EXAMPLE 5

A sample was obtained in the same manner as in Reference Test Example 1, except that 100 parts by weight of an ionomer resin made from ethylene-methacrylate copolymer crosslinked with Na (Himilan 1555 manufactured by DuPont-Mitsui Polychemicals Co., Ltd.) were used as the intermediate adhesive resin layer.

REFERENCE TEST EXAMPLE 6

A sample was obtained in the same manner as in Reference Test Example 1, except that 10 parts by weight of the maleic acid anhydride modified polyethylene used in Reference Test Example 1, and 90 parts by weight of the polymethyl pentene resin also used in Reference Test Example 1, had been melted and mixed into pellets in advance using a two-axis extruder and were used as the intermediate adhesive resin layer.

REFERENCE TEST EXAMPLE 7

A sample was obtained in the same manner as in Reference Test Example 8, except that the ionomer resin made from ethylene-methacrylate copolymer crosslinked with Zn used in Reference Test Example 4 was used as the intermediate adhesive resin layer, instead of the maleic acid anhydride modified polyethylene.

REFERENCE TEST EXAMPLE 8

A sample was obtained in the same manner as in Reference Test Example 1, except that 100 parts by weight of a maleic acid anhydride modified polypropylene were used as the intermediate adhesive resin layer.

REFERENCE TEST EXAMPLE 9

A sample was obtained in the same manner as in Reference Test Example 1, except that 100 parts by weight of an ethylene-methacrylate copolymer (Nucrel AN4213C manufactured by DuPont-Mitsui Polychemicals Co., Ltd.) were used as the intermediate adhesive resin layer.

REFERENCE TEST EXAMPLE 10

A sample was obtained in the same manner as in Reference Test Example 1, except that a polybutylene terephthalate (PBT) (500FP manufactured by Polyplastics Co., Ltd.; melting point 223° C.) was used as the outermost thermoplastic resin layer.

REFERENCE TEST EXAMPLE 11

A sample was obtained in the same manner as in Reference Test Example 1, except that a polyethylene terephthalate (Selar PT7001 manufactured by DuPont-Mitsui Polychemicals Co., Ltd.; melting point 254° C.) was used as the outermost thermoplastic resin layer.

Reference Comparative Example 1

Using the same cast coat paper employed in Reference Test Example 1 as the base paper, 100 parts by weight of a polymethyl pentene resin, used as a thermoplastic resin, were extruded and laminated at 320° C. so that the thickness would become 5 μm.

Reference Comparative Example 2

Using the same cast coat paper employed in Reference Test Example 1 as the base paper, 100 parts by weight of a polymethyl pentene resin used as the outermost thermoplastic resin layer, and 100 parts by weight of a linear low-density polyethylene synthesized with single-site catalyst used as the layer on base material surface, were co-extruded and laminated at 320° C. The thicknesses of laminated resins were 5 and 30 μm in the order of outermost layer and layer on base material side.

Reference Comparative Example 3

Using the same cast coat paper employed in Reference Test Example 1 as the base paper, 100 parts by weight of a polypropylene resin (melting point 158° C.) used as the outermost thermoplastic resin layer, and 100 parts by weight of a linear low-density polyethylene synthesized with single-site catalyst used as the layer on base material surface, were co-extruded and laminated at 320° C. The thicknesses of laminated resins were 20 and 20 μm in the order of outermost layer and layer on base material side.

Reference Comparative Example 4

A sample was obtained in the same manner as in Reference Test Example 1, except that 100 parts by weight of a hydrogenated SBR constituted by styrene-butadiene copolymer to which hydrogen had been added (Dynaron 1320P manufactured by Japan Synthetic Rubber Co., Ltd.) were used as the intermediate resin layer.

TABLE 1

Layer constitutions of laminated sheets

| | Outermost layer | Intermediate layer (adhesive resin) | Layer on base material | Base material |
|---|---|---|---|---|
| Reference Test Example 1 | Polymethyl pentene | Maleic acid anhydride modified polyethylene | SS-LLDPE | Cast coat paper |
| Reference Test Example 2 | Polymethyl pentene | Maleic acid anhydride modified polyethylene | SS-LLDPE | High-grade paper |
| Reference Test Example 3 | Polymethyl pentene | Maleic acid anhydride modified polyethylene | SS-LLDPE | Coat paper |
| Reference Test Example 4 | Polymethyl pentene | Ethylene-methacrylate copolymer crosslinked with | SS-LLDPE | Cast coat paper |
| Reference Test Example 5 | Polymethyl pentene | Ethylene-methacrylate copolymer crosslinked with | SS-LLDPE | Cast coat paper |
| Reference Test Example 6 | Polymethyl pentene | Mixture of maleic acid anhydride modified polyethylene and polymethyl | SS-LLDPE | Cast coat paper |
| Reference Test Example 7 | Polymethyl pentene | Mixture of ethylene-methacrylate copolymer crosslinked with Zn and | SS-LLDPE | Cast coat paper |
| Reference Test Example 8 | Polymethyl pentene | Maleic acid anhydride modified polypropylene | SS-LLDPE | Cast coat paper |
| Reference Test Example 9 | Polymethyl pentene | Ethylene-methacrylate copolymer | SS-LLDPE | Cast coat paper |
| Reference Test Example 10 | Polymethyl pentene | Maleic acid anhydride modified polyethylene | SS-LLDPE | Cast coat paper |
| Reference Test Example 11 | Polyethylene terephthalate | Maleic acid anhydride modified polyethylene | SS-LLDPE | Cast coat paper |
| Reference Comparative Example 1 | Polymethyl pentene | — | — | Cast coat paper |
| Reference Comparative Example 2 | Polymethyl pentene | — | SS-LLDPE | Cast coat paper |
| Reference Comparative Example 3 | Polypropylene | — | SS-LLDPE | Cast coat paper |
| Reference Comparative Example 4 | Polymethyl pentene | Hydrogenated SBR | SS-LLDPE | Cast coat paper |

Note)
In the "Layer on base material side" column, "SS-LLDPE" refers to a linear low-molecular polyethylene synthesized with single-site catalyst.

TABLE 2

| | Reference test examples | | | | | | | | | | |
|---|---|---|---|---|---|---|---|---|---|---|---|
| | 1 | 2 | 3 | 4 | 5 | 6 | 7 | 8 | 9 | 10 | 11 |
| Condition of sticking | ◎ | ◎ | ◎ | ◎ | ◎ | ◎ | ◎ | ◎ | ◎ | ○ | ○ |
| Interlayer separation | ◎ | ◎ | ◎ | ○ | ○ | ○ | ○ | ○ | ○ | ○ | ○ |
| Adhesion | ◎ | ◎ | ◎ | ◎ | ◎ | ◎ | ◎ | ◎ | ◎ | ○ | ○ |
| Gloss | 95 | 86 | 94 | 95 | 91 | 93 | 92 | 93 | 94 | 93 | 95 |

TABLE 3

| | Reference comparative examples | | | |
|---|---|---|---|---|
| | 1 | 2 | 3 | 4 |
| Condition of sticking | ◎ | ○ | X | ◎ |
| Interlayer separation | — | X | ○ | X |
| Adhesion | Δ | ◎ | ◎ | ◎ |
| Gloss | 95 | 95 | 93 | 90 |

As shown from the above results, the laminated sheets obtained by Reference Test Examples 1 to 11 conforming to the present invention, where the sheets had an outermost layer constituted by a thermoplastic resin with a melting point of 180° C. or above, did not fuse with or stick to the heating roll during printing, were found suitable for recording under the electronic photograph printing method, and maintained gloss after recording. Also the laminated sheets conforming to the present invention exhibited strong adhesion between the thermoplastic resin layers, and in particular the sheets obtained by Reference Test Examples 1 to 3 demonstrated very strong adhesion. The laminated sheets having a SS-LLDPE layer on the base material, obtained by Reference Test Examples 1 to 9, also had good adhesion with the base material. The laminated sheets obtained by Reference Test Examples 10 and 11, where the sheets had an outermost layer constituted by polybutylene terephthalate and polyethylene terephthalate, showed slightly weaker adhesion with the base material compared to when the outermost layer was constituted by polymethyl pentene, and these sheets also had minimal gloss, probably due to the poor fluidity of molten constituent resins.

On the other hand, the laminated sheet obtained by Reference Comparative Example 1, in which the outermost thermoplastic resin layer was directly laminated onto the base material, exhibited poor adhesion with the base material. The laminated sheet obtained by Reference Comparative Example 3 caused no separation between the thermoplastic resin layers and had excellent adhesion with the base material. However, use of a thermoplastic resin with a melting point of 180° C. or below as the outermost layer had the effect of triggering thermal fusion during recording, which caused the sheet to stick to the heating roll. Also, the laminated sheet without any intermediate layer below the outermost layer as obtained by Reference Comparative Example 2, and the laminated sheet as obtained by Reference Comparative Example 4 whose intermediate layer was constituted by an adhesive resin other than candidate resins recommended as favorable under the present invention, both caused separation between the resin layers. The laminated sheet obtained by Reference Comparative Example 4 caused separation between the outermost layer and the intermediate layer underneath.

Additional tests that consider formability and operability of laminating a thermoplastic resin on the base material were conducted based on the thermoplastic resins used for the outermost layers in Reference Test Examples 1, 10 and 11 and Reference Comparative Example 3. Table 4 shows the results of these tests, including the results of the evaluation tests explained earlier.

<Formability>

Using a cast coat paper (CLC Cast manufactured by Nippon Paper Industries Co., Ltd.) as the base material, each thermoplastic resin was extruded and laminated onto the base material at a temperature of 320° C., lamination width of 500 mm and speed of 200 m/min, to a thickness of 20 µm. The process was visually evaluated based on the following criteria:

⊚: The resin could be laminated with a uniform lamination width.
○: The resulting laminated sheet was fit for use, although the lamination width was slightly irregular.
Δ: Processing was difficult because the lamination width became irregular, but the resulting laminated sheet presented no problem as a product.
x: Processing was very difficult because the molten resin film moved about and the lamination width became irregular.

<Operability>

Extrusion lamination was performed in the same manner as described above, and the resin film thus obtained was visually evaluated based on the following criteria:
⊚: A homogeneous molten resin film was formed and a good resin layer was obtained.
○: Bubbles generated in some areas of the molten resin film.
Δ: Bubbles generated in the molten resin film.
x: Bubbles generated in the molten resin film and holes were made, resulting in a mesh-like resin layer.

TABLE 4

|  | 1 | 10 | 11 | 3 |
| --- | --- | --- | --- | --- |
| Resin type | TPX (DX820M) | PBT (500FP) | PET (PT7001) | Polypropylene |
| Condition of sticking | ⊚ | ○ | ○ | X |
| Interlayer separation | ⊚ | ○ | ○ | ○ |
| Adhesion | ⊚ | ○ | ○ | ⊚ |
| Gloss | 95 | 93 | 95 | 93 |
| Formability | ⊚ | Δ | Δ | ○ |
| Operability | ⊚ | Δ | Δ | ○ |
| Overall evaluation | ⊚ | ○ | Δ | X |

As evident from Table 4, the polymethyl pentene resin (TPX) can be used favorably because it does not fuse with and stick to the heating roll during electronic photograph printing, offers excellent adhesion with the base material and other thermoplastic resin layers, and also provides advantages in terms of ease of handling such as formability and operability. On the other hand, polybutylene terephthalate (PBT) and polyethylene terephthalate (PET) are not ductile and offer poor fluidity. Therefore, when these resins are extruded onto the base material the molten resin film meanders and makes formation of film difficult.

In addition, PBT and PET absorb water easily and therefore allow water content to foam when the molten resin exits the T die (as indicated by popping sounds that occur when the hot resin that has remained at or above the boiling point inside the T die suddenly comes in contact with outside air), and if the resin contained a large amount of water, holes will be created in the resin film. If holed resin film is spread over the base material and laminated, a mesh-like resin layer will result. To prevent this from happening, PBT and PET must be dried before the heating/fusion process. Even with a pre-drying process, however, these resins may absorb water gradually inside the hopper (a part of the extruder into which resin is charged), in which case operability is still affected. In the aforementioned operability tests, PET and PBT had been dried for 4 hours at 130° C. before use.

On the other hand, TPX has high ductility and can be formed as a molten resin film with straight edges on both sides. Since it does not absorb water, TPX can be used directly without drying. These features ensure excellent operability.

[3. Base Material]

[3.1 Paper Production]

According to the present invention, the base material mainly refers to a paper that has been produced by causing plant fibers or plant fibers and other fibers to entwine with one another and then agglutinating the entwined fibers. The base material may be a high-grade paper, recycled paper, or coat paper (coated paper), among others. There are no specific limitations on the paper material, such as type of pulp. For example, wood fibers from leaf bleached kraft pulp (LBKP), northern bleached kraft pulp (NBKP), thermo-mechanical pulp, groundwood pulp, and de-inked pulp (DIP) can be mainly used, as well as non-wood fibers from cotton linter, kenaf, hemp, and bamboo, if necessary.

Fillers that can be combined with fibers include heavy calcium carbonate, light calcium carbonate, kaolin, clay, talc, hydrated silicic acid, white carbon, titanium oxide, synthetic resin fillers and other known filters. The filler content should preferably be 6 percent by weight or more per the weight of pulp. If necessary, aluminum sulfate, sizing agents, paper-strength increasing agents, yield-enhancing agents, coloring pigments, dyes, defoaming agents, etc., may also be added.

The method of making paper is not specifically limited, and a paper made by a fourdrinier machine, cylinder machine or any other machine including a top-wire type, based on any method such as an acid papermaking method, neutral paper-making method or alkali papermaking method, can be used. Of course, a medium-quality paper containing mechanical pulp can be used, as well. It is also possible to apply surface treatment agents constituted mainly by water-soluble polymers, in order to improve surface strength and sizing property. These water-soluble polymers may be oxidized starch, hydroxy ethyl etherified starch, enzyme modified starch, polyacrylic amide, polyvinyl alcohol and other polymers that are normally used as surface treatment agents, which may be used alone or one or more polymers may be combined. It is also possible to add paper-strength increasing agents that improve water resistance and surface strength, as well as external sizing agents that add sizing property, to surface treatment agents in addition to water-soluble polymers. Surface treatment agents can be applied using any coater, such as a two-roll sizing press coater, gate roll coater, blade metering sizing press coater, rod metering sizing press coater, shim sizer or any other film-transfer type roll coater.

[3.2 Bulky Paper]

Papers used in accordance with the present invention should preferably contain organic compounds having the effect of inhibiting inter-fiber bond in pulp. If compounds having the effect of inhibiting inter-fiber bond in pulp (these compounds may also be referred to as "bulk-increasing agents" hereinafter) are added, the resulting inhibition of inter-fiber bond in pulp, or lower density (higher bulk), increases voids and consequently allows the paper to become lighter at the same thickness.

With a normal paper, the heat from the heating roll is partly released from the paper surface when the paper is ejected, and partly stored in the paper. After printing, the temperature of paper surface drops suddenly due to the release of heat, but if a large number of sheets are printed at high speed the heat stored in the paper is transferred to the surface and this heat causes the surface temperature to rise again. As a result, the risk of toner blocking increases. In addition, since the thermoplastic resin layers release heat more slowly than the paper, more heat is stored inside the paper, which further increases the risk of toner blocking. With a bulky paper, on the other hand, the heat storage property is low due to the heat insulation property and low density achieved by many voids present in the paper. Accordingly, when the laminated sheet is heated by the heating roll the heat is released from the surface and the aforementioned heat insulation property and low heat storage property of the bulky paper prevent heat from being stored in the printed sheets as they are stacked. As a result, occurrence of toner blocking is prevented. In a stack, bulky sheets do not cause the non-printed side to release heat to the printed side of the sheet below it, because the center of the bulky paper creates a heat insulation layer that prevents heat from conducting from the non-printed side. As explained above, use of a bulky paper as the base material helps suppress temperature rise even when the laminated sheet has thermoplastic resin layers of poor heat release property. This suppresses temperature increase of the sheet as a whole and consequently reduces toner blocking.

[3.2.1 Agents Inhibiting Inter-Fiber Bond in Pulp]

Organic compounds having the effect of inhibiting inter-fiber bond in pulp can be selected using the test explained below. A paper made with any such organic compound can also be used as the base paper for a cast coat paper, which is one type of base material explained later. A pulp composition constituting the target paper is mixed with 0.3 part by weight of the organic compound to be tested, relative to 100 parts by weight of the bone dry weight of pulp, and then the obtained pulp slurry is processed with an experimental oriented paper-making machine (manufactured by Kumagai Riki Kogyo Co., Ltd.) at a rotating speed of 900 rpm, and the processed paper was pressed and dried in accordance with the method specified in JIS P-8209. The drying process was implemented at 50° C. for 1 hour using a blow dryer. The obtained test sheet was left for 24 hours in an environment of 23° C. and relative humidity of 50%, after which tensile strength was measured in accordance with JIS P-8113. If the tensile strength drops, the applicable organic compound has the effect of inhibiting inter-fiber bond as desired under the present invention. If the rate of drop in tensile strength is very low, the applicable organic compound has less bulk-increasing effect and must therefore be added in a larger quantity. If the rate of drop in tensile strength is high, the applicable organic compound can exhibit bulk-increasing effect with a small quantity. In summary, any organic compound that results in lower tensile strength can be used. However, its content should be adjusted so that when the organic compound is added by 0.3%, tensile strength will drop by 5 to 30%, or preferably by 8 to 20%.

Organic compounds having the effect of inhibiting inter-fiber bond in pulp as desired by the present invention (hereinafter referred to as "bond-inhibiting agents") are compounds that have both hydrophobic and hydrophilic groups and exhibit the effect of lowering tensile strength as demonstrated by the aforementioned test. Commercial density-reducing agents (or bulk-increasing agents) introduced in recent years for the purpose of increasing paper bulk in paper production applications are suitable for use as bond-inhibiting agents under the present invention. For example, the compounds, etc., described in International Patent Laid-open No. WO98/03730 and Japanese Patent Laid-open Nos. Hei 11-200284, Hei 11-350380, 2003-96694 and 2003-96695, among others, can be used.

To be specific, bond-inhibiting agents that can be used include an ethylene and/or propylene oxide adducts of higher alcohols; polyhydric-alcohol type nonionic surface active agents; ethylene oxide adducts of higher fatty acids; esterified compounds of polyhydric alcohols and fatty acids; ethylene oxide adducts of esterified compounds of polyhydric alcohols and fatty acids; or fatty acid polyamide amine, fatty acid diamide amine, fatty acid monoamide, or condensates of polyalkylene polyamines, fatty acids and epichlorohydrins, all of which may be used alone or two or more substances may be combined. More preferable among the above are esterified compounds of polyhydric alcohols and fatty acids, fatty acid diamide amine, fatty acid monoamide, and condensates of polyalkylene polyamines, fatty acids and epichlorohydrins. Commercially available bulk-increasing chemicals include Sursol VL by BASF, Bayvolume P Liquid by Bayer AG, KB-08T, KB-08W, KB-110 and KB-115 by Kao Corporation, Reactopaque by Sansho Co., Ltd., PT-205 by Japan PMC Corporation, DZ2220 and DU3605 by NOF Corporation, and R21001 by Arakawa Chemical Industries, Ltd., all of which may be used alone or two or more chemicals may be combined. According to the present invention, the content of agents inhibiting inter-fiber bond in pulp should preferably be in a range of 0.1 to 10 parts by weight, or more preferably in a range of 0.2 to 1.0 part by weight, relative to 100 parts by weight of pulp.

[3.2.2 Reference Test (2)—Agents Inhibiting Inter-Fiber Bond in Pulp]

The following explains reference test examples in which agents inhibiting inter-fiber bond in pulp were used.

Each of the chemicals shown in Table 5 was added by 0.3 part to a 1% slurry comprising 30 parts of NBKP and 70 parts of refiner ground pulp (RGP), and the slurry was then mixed to adjust the paper material. The obtained paper material was processed using an experimental oriented papermaking machine manufactured by Kumagai Riki Kogyo Co., Ltd. at a rotating speed of 900 rpm, and the processed paper was pressed and dried in accordance with the method specified in JIS P-8209. The drying process was implemented at 50° C. for 1 hour using a blow dryer to obtain a test paper. The obtained test paper was left for 24 hours at a temperature of 23° C. and relative humidity of 50%, after which tensile strength was measured in accordance with JIS P-8113. The results are shown in Table 1. The rate of drop in tensile strength was calculated with respect to the tensile strength measured on a paper made without adding any bond-inhibiting agent.

TABLE 5

| Bond-inhibiting agent | Tensile strength (Kn/m) | Rate of drop in tensile strength (%) | Fitness for bond inhibition |
|---|---|---|---|
| KB-115 (Kao Corporation) | 1.52 | 15.0 | ○ |
| KB-110 (Kao Corporation) | 1.50 | 14.8 | ○ |
| KB-08W (Kao Corporation) | 1.53 | 13.7 | ○ |
| Sursol VL (BASF) | 1.56 | 9.8 | ○ |
| Bayvolume P Liquid (Bayer AG) | 1.59 | 9.7 | ○ |
| Reactopaque (Sansho Co., Ltd.) | 1.63 | 7.4 | ○ |
| Oleic acid | 1.66 | 5.7 | Δ |
| Isopropyl alcohol | 1.73 | 1.7 | Δ |
| Polyethylene glycol | 1.73 | 1.7 | Δ |
| Starch | 1.85 | −5.1 | X |
| Casein | 1.89 | −7.4 | X |
| Polyacrylic amide | 2.00 | −13.6 | X |
| None | 1.76 | — | — |

[3.3 Smooth Paper]

A laminated sheet offering high gloss and esthetically very pleasing look can be achieved by using a base material that is as smooth as possible. Base materials offering high smoothness are those having a surface roughness Rz of 5.0 μm or below, or preferably 1.0 μm or below, or more preferably 0.6 μm or below, on one side or both sides. High-grade papers and coat papers can be used for this purpose, for example, but coat papers, especially cast coat papers, are preferable because they provide a surface texture resembling that of a silver salt photograph.

A paper used as the base material of laminated sheet is constituted by plant fibers, etc., entwined with one another in a complex manner, and therefore has numerous fine irregularities on its surface. Therefore, when a thermoplastic resin is laminated on this base material by means of the extrusion lamination method or co-extrusion lamination method, the molten resin extruded in thin film state onto the base material surface is laminated in a manner conforming its shape to these surface irregularities. Of these irregularities, projections can be corrected to a certain degree by using, when the base material and molten resin are pressed and pressure-bonded together, a cooling roll having a very smooth mirror-finished periphery that comes in contact with and presses the molten resin, thereby transferring the smooth surface property of the cooling roll to the resin surface. However, some uncorrectable depressions remain and create minute dents on the laminated sheet surface that affect the esthetically pleasing look of the laminated sheet.

To address this problem, the present invention uses a base material with a surface roughness Rz of 5.0 μm or below to achieve high gloss and esthetically pleasing look, thereby providing a laminated sheet with an image clarity of 50% or more. Image clarity indicates the level of how an object is represented on paper surface. The higher the value of image clarity, the clearer the object is represented just like an image in a mirror. In other words, a higher image clarity value indicates a more esthetically pleasing look. For your reference, image clarity is measured in accordance with JIS K-7105. In essence, this measurement method measures the degree of clarity of an image transmitted through or reflected on the test piece (clarity of an image reflected on the test piece applies in the case of the present invention), which is achieved by irradiating light through a moving engineering comb and then processing measured values using calculation formulas.

Other indicators that can be used to measure smoothness of paper include Oken smoothness and Bekk smoothness. However, these measurement methods require air to be blown onto the surface to measure the number of seconds required by air to pass through. As a result, the difference becomes small between a paper whose projections have been corrected but which still have depressions, and a paper whose projections and depressions have both been corrected. On the other hand, the method of measuring surface roughness selected by the present invention uses a probe to trace the surface. Therefore, a flat surface without projections that still has depressions can be detected reliably. For clarification, the term "surface roughness" used in connection with the present invention refers to the ten-point average roughness (Rz) measured in accordance with JIS B-0601. To give you a brief explanation of the measurement method, first the target surface is cut by a plane perpendicular to an average surface of the target surface. Then, reference lengths of the rings (cross-section curves) appearing on the cut surface are extracted and among the straight lines running in parallel with an average line, one passing the third highest hill and another passing the third deepest trough are selected. The distance between these two straight lines is measured in the direction of longitudinal magnification of cross-section curves, and the measured distance is indicated in micrometers. The method to improve the surface roughness of paper to obtain a base material suitable for use under the present invention is not at all limited. For example, projections on the paper surface can be pressed using a calendar, or a coat layer can be provided on the surface just like on a coat paper. However, the former smoothening method using a calendar does not effectively correct depressions even though it can correct projections. Also, since the rigidity of a laminated sheet on which a thermoplastic resin is laminated by means of the extrusion lamination method or co-extrusion lamination method is affected by the rigidity of its base material, a paper whose surface has been smoothened using calendaring naturally has lower rigidity because the paper is squeezed many times as it passes between rolls repeatedly. On the other hand, providing a coat layer on the surface smoothens the surface by filling the depressions on the paper. Accordingly, this method is more suitable for correcting the base paper for use in a laminated sheet according to the present invention.

[3.3.1 Coat Paper]

A coat paper is generally constituted by a base paper and a coat layer that mainly contains binders and organic or inorganic pigments. Coat papers are used widely as printing sheets or recording sheets in connection with various printing/recording methods. Production methods of coat paper are also known, and materials and apparatuses normally used can be employed as deemed appropriate. For example, binders may be polyvinyl alcohol, styrene polymer, styrene-butadiene copolymer, styrene-acrylic copolymer, ethylene-vinyl acetate copolymer and their derivatives. Pigments may be kaolin, calcined clay, talc, silica, alumina, etc. These binders, pigments, and various other additives as deemed necessary are dispersed in a water-based solution to prepare a coating solution, after which the prepared solution is applied onto the surface of the base paper using an air-knife coater, blade coater, roll coater, curtain coater, gravure coater, die coater, etc., to provide a coat layer.

In the case of a cast coat paper, in particular, a coat layer, while still wet, is pressed against a heated metal drum having a mirror surface for drying, in order to obtain a smooth surface. Accordingly, use of a cast coat paper as the base material improves the surface smoothness of a laminated sheet obtained in accordance with the present invention.

A cast coat paper can be produced by the method explained below. A paper on which a coating solution has been applied is not dried, but its coated side is pressed against a cast drum. As the paper is pressed against the cast drum, the water content in the coating solution evaporates from the back of the paper. In the meantime, the cast drum comprises a mirror-surface drum and therefore the side of paper (coated side) pressed against the cast drum exhibits high gloss. In addition to the direct production method explained above, the solidification method in which the coasting solution applied on the coated surface is gelatinized using a solidification agent, or the rewetting method in which the coated surface is dried and then wetted again to be finally pressed against the cast drum, are also available. A cast coat paper obtained by any of these methods can be used as the base material under the present invention.

When a cast coat paper is used, a laminated sheet offering superior gloss and esthetically very pleasing look can be obtained. Coat papers produced by other coating methods also provide a uniform coat layer, but if the base paper has irregularities, these irregularities are directly reflected and the coat paper surface may not always have good roughness. On the other hand, coat papers produced by the cast coat method, in which the coat layer is pressed against a mirror surface while still soft, provide papers having smooth surface and good roughness suitable for use as the base material under the present invention.

[3.3.2 Cast Coat Paper by Rewetting Method]

As explained above, use of a base material with a surface roughness Rz of 5.0 μm or below achieves a laminated sheet with excellent gloss and esthetically pleasing look suitable for commercial posters, etc. Since commercial posters are used in outdoor locations subject to rain and higher humidity, laminated sheets for posters must have water resistance on cut surface as an additional feature.

To improve water resistance on cut surface, water-absorbing property can be adjusted by increasing the sizing property of paper, or in the case of a coat paper, adjusting the types and quantities of pigments, binders and other additives contained in the coat layer.

In addition, the present invention can use, among other cast coat papers, a cast coat paper produced by the rewetting method in which specific pigments and adhesives are used as key ingredients to make a coating material composition for the coat layer, and the coat layer, while still wet, is pressed and dried using a heated mirror-finished surface, because use of such cast coat paper further enhances the gloss and esthetically pleasing look while also improving water resistance on cut surface. This embodiment is explained in details below.

[3.3.2.1 Coating Material Composition]

A cast coat layer is formed by preparing a coating material composition containing pigments, binders and various other additives as deemed necessary, and then applying the prepared composition onto a base paper.

According to the present invention, pigments contained in the cast coat layer should contain kaolin by 50 parts by weight or more, or preferably 60 parts by weight or more, or most preferably 70 parts by weight or more, relative to 100 parts by weight of inorganic pigments, wherein the kaolin has a grain size distribution such that grains with a size of 0.4 to 4.2 μm account for 65% or more by volume. This grain size distribution represents a percentage of grains whose size falls within a range of 0.4 to 4.2 μm, as measured using a laser-diffraction/scattering grain size distribution measuring equipment (Mastersizer S manufactured by Malvern Instruments, Ltd.).

It is also desirable that plastic pigments also be contained in the coating material composition. The content should be 5 to 50 parts by weight, or more preferably 10 to 45 parts by weight, or most preferably 20 to 45 parts by weight, relative to 100 parts by weight of inorganic pigments. Plastic pigments used under the present invention may be solid plastic pigments, hollow plastic pigments or plastic pigments having a core-shell structure, all of which may be used alone or two or more plastic pigments may be combined as necessary.

The content of solid plastic pigments should be 10 to 50 parts by weight, or more preferably 20 to 45 parts by weight, relative to 100 parts by weight of inorganic pigments. The content of hollow plastic pigments should be 5 to 25 parts by weight, or more preferably 10 to 23 parts by weight, relative to 100 parts by weight of inorganic pigments. Polymers mainly constituting plastic pigments may be monomers such as styrene and/or methyl methacrylate, which may be combined with other monomers that can be co-polymerized with the aforementioned monomers.

These monomers that can be co-polymerized include α-methyl styrene, chloro styrene, dimethyl styrene and other olefin aromatic monomers; methyl(meth)acrylate, ethyl (meth)acrylate, butyl(meth)acrylate, 2-ethyl hexyl(meth) acrylate, glycidyl(meth)acrylate, nitrile (meth)acrylate and other monoolefin monomers; and vinyl acetate and other monomers. If necessary, it is also possible to use, for example, acrylic acid, methacrylic acid, itaconic acid, maleic acid, fumaric acid, crotonic acid and other olefin unsaturated carbonic acid monomers; hydroxy ethyl, hydroxy ethyl methacrylate, hydroxy propyl acrylate and other olefin unsaturated hydroxy monomers; acryl amide, methacryl amide, N-methylol acryl amide, N-methoxy methyl acryl amide, N-methoxy methyl methacryl amide and other olefin unsaturated amide monomers; and divinyl benzene and other dimer vinyl polymers, wherein at least one or two or more of the foregoing can be selected and combined. These monomers are provided only as examples and other monomers may also be used as long as they can be co-polymerized. As for plastic pigments used under the present invention, those having an average grain size of 0.1 to 1.5 µm, or preferably 0.1 to 1.0 µm, or more preferably 0.1 to 0.6 µm, as measured using a laser-diffraction/scattering grain size distribution measuring equipment can be used, because plastic pigments of these grain sizes do not cause air permeability or surface strength to drop.

In addition to the pigments mentioned above, other inorganic pigments that are traditionally used with coat papers can also be used, such as kaolin, clay, delaminated clay, heavy calcium carbonate, light calcium carbonate, talc, titanium dioxide, barium sulphate, calcium sulphate, zinc oxide, silicic acid, silicate, colloidal silica and satin white, of which one or more may be selected and used as necessary. In particular, white paper gloss and gloss after printing can be improved to provide a cast surface with excellent texture if, as proposed by the present invention, kaolin is added by 50 parts by weight or more, or preferably 70 parts by weight or more, relative to 100 parts by weight of inorganic pigments, wherein the kaolin has a grain size distribution such that grains with a size of 0.4 to 4.2 µm account for 65% or more by volume.

Adhesives (binders) used in the cast coat are not specifically limited, and one or more adhesives normally used for coat paper can be selected as deemed appropriate from those such as: styrene-butadiene copolymer, styrene-acrylic copolymer, ethylene-vinyl acetate copolymer, butadiene-methyl methacrylate copolymer and other various copolymers traditionally used with coat papers; polyvinyl alcohols, maleic acid anhydride copolymer, acrylic acid-methyl methacrylate copolymer and other synthetic adhesives; casein, soybean protein, synthetic protein and other proteins; oxidized starch, positive starch, urea phosphate esterified starch, hydroxy ethyl etherified starch and other etherified starches, dextrin and other starches; and carboxy ethyl cellulose, hydroxy ethyl cellulose, hydroxy methyl cellulose and other cellulose derivatives. These adhesives are used in a range of approx. 5 to 50 parts by weight, or more preferably 5 to 30 parts by weight, relative to 100 parts by weight of inorganic pigments.

The cast coat layer can also contain, in addition to the pigments and adhesives mentioned above, various additives as deemed appropriate such as sodium chloride, ammonium chloride, zinc chloride, magnesium chloride, sodium sulphate, potassium sulphate, ammonium sulphate, zinc sulphate, magnesium sulphate, ammonium nitrate, sodium dihydrogen phosphate, ammonium phosphate, calcium phosphate, sodium polyphosphate, sodium hexametaphosphate, sodium formate, ammonium formate, sodium acetate, potassium acetate, sodium monochloroacetate, sodium malonate, sodium tartrate, potassium tartrate, sodium citrate, potassium citrate, sodium lactate, sodium gluconate, sodium adipate, sodium dioctyl sulfosuccinate and other ammonium salts and metal salts of inorganic acids and organic acids; methyl amine, diethanol amine, diethylene triamine, and diisopropyl amine. In addition, various auxiliaries that are normally blended with coating material compositions for coat paper can also be added as necessary, such as dispersants, viscosity-increasing agents, water-reserving agents, defoaming agents, coloring agents, release agents, fluidity modifiers, water-resistant adding agents, preservatives and printability-improving agents.

[3.3.2.2 Coating Base Paper]

The base paper on which a cast coat layer is applied may be any of the papers described in [1.1 Materials, Base Materials], but it may also be a paper on which a coating solution containing pigments and adhesives used with general coat paper is applied using any of the aforementioned coaters, or a paper on which any of the aforementioned surface treatment agents is applied and dried and then a coating solution is applied using a blade coater, roll coater, air-knife coater, etc. In this case, the coating weight should desirably be approx. 5 to 30 g/m$^2$ by dry weight on each side. If necessary, the pre-coated base paper may be smoothened in advance by means of super calendaring, soft calendaring, etc. The basis weight should be approx. 30 to 200 g/m$^2$, or preferably 50 to 180 g/m$^2$.

[3.3.2.3 Method of Forming Cast Coat Layer]

A cast coating material composition can be applied on the base paper using a two-roll sizing press coater, gate roll coater, blade metering sizing press coater, rod metering sizing press coater, shim sizer, JF sizer or any other film-transfer type roll coater; flooded nip/blade coater, jet fountain/blade coater or short dwell-time applicator coater; rod metering coater using a grooved rod or plane rod instead of blade; or air-knife coater, curtain coater, die coater, or any other known coater. The coating weight should preferably be 5 to 30 g/m$^2$, or more preferably be 10 to 20 g/m$^2$, on each side of the base paper.

After coating, the coated paper can be treated using the direct method in which the coat layer is mirror-finished while still wet, the solidification method in which the wet coat layer is solidified and then mirror-finished, or the rewetting method in which the wet coating layer is dried and then rewetted with a rewetting solution to be finally mirror-finished. Among others, the rewetting method provides excellent quality and operability. The wet coat layer can be dried using, for example, the aforementioned heating cylinder, or a hot air dryer, gas heater dryer, electric heater dryer, infrared heater dryer or any of the various types of dryers, all of which can be used alone or in combination. The target dryness of coat paper varies depending on the type of base paper, type of coating material composition, and so on. In general, however, the coat paper should be dried so that the water content in the paper falls within a range of approx. 1 to 10%, or more preferably within a range of approx. 2 to 7%. According to the present invention, the dried coat layer may be mirror-finished directly using the rewetting method, but it is preferable to provide some kind of surface treatment, such as smoothening, to the dried coat paper to improve white paper gloss, smoothness, gloss after printing, and so on. As for the method of surface treatment, a super calendar using elastic rolls made of cotton, soft nip calendar using elastic rolls made of synthetic resin, brush, or any other known surface treatment apparatus may be used. In particular, the gloss of coat paper before mirror finish can be adjusted to 70% (75°) or above to improve white paper gloss, gloss after printing, and other characteristics affecting quality.

In a mirror finish designed to achieve high gloss by causing the target surface to be pressed against a heated mirror-finished surface, the intended effect can be achieved more prominently if a cast method wherein the temperature of the mirror-finished surface is adjusted to 100° C. or above is used.

In a mirror finish, a press roll is used to press the wet coat paper against a heated, mirror-surface roll surface, and dry the paper. A cast drum, etc., can be used as the mirror-surface roll.

As for the conditions under which the coat paper is pressed against the mirror-surface roll surface using the press roll to add gloss, the surface temperature of the heated mirror-surface roll can be adjusted to a range of 80 to 200° C., while the press tonnage during pressure-bonding can be adjusted to a range of approx. 30 to 250 kg/cm.

The rewetting solution is not specifically limited and any normal rewetting solution can be used, such as an aqueous solution or emulsion containing a polyethylene emulsion, fatty acid soap, calcium stearate, microcrystallin wax, surface active agent, turkey red oil or any other release agent by 0.01 to 3 percent by weight. Needless to say, alkalis, sodium hexametaphosphate and other phosphates, urea, organic acids, etc., can also be used in combination to promote the plasticization of the dry coat layer.

[3.3.2.4 Relationship with Gloss and Esthetically Pleasing Look]

A cast coat paper used in accordance with the present invention presents the effects more prominently when the white paper gloss is (20°) 30% or above or the image clarity is 70% or above. It is not entirely clear why use of the aforementioned cast coat paper as the base material provides excellent gloss and esthetically pleasing look under the present invention. However, one possible explanation is given below.

According to the present invention, the cast coat layer contains kaolin having a narrowly specified grain size distribution along with plastic pigments. This reduces the filling ratio of pigment grains in the coat layer, thereby improving the coverage and enhancing the adhesion with the mirror-finished surface when the coat layer is pressed against the mirror-finished surface. This, in turn, makes it easy to transfer the mirror-finished surface property onto the surface of the toner-fixing layer formed on the surface of the laminated sheet conforming to the present invention. In addition, softening of plastic pigments due to the heat from the mirror-finished surface further enhances the adhesion between the coat layer and the mirror-finished surface to facilitate the transfer of mirror surface property. These factors are probably the reasons why the coat paper provides improved gloss, and the gloss after lamination of thermoplastic resin also remains high. According to the present invention, the coat layer is smoothened using calendaring before it is rewetted using a rewetting solution, which further improves gloss. An application for patent has been filed under International Patent Application No. PCT/JP2004/15275 relating to a cast coat layer formed by the aforementioned rewetting method.

[3.3.2.5 Relationship with Water Resistance on Cut Surface]

Use of the aforementioned cast coat paper as the base material has an impact on water resistance on cut surface in that, since the water-absorbing property of plastic pigments contained in the cast coat layer is very low compared to that of inorganic pigments normally used, water absorption by the coat layer is prevented and water resistance on cut surface improves as a result.

If the base paper is mixed with organic compounds having the effect of inhibiting inter-fiber bond in pulp, the resulting inhibition of inter-fiber bond in pulp, or namely lower base paper density (higher bulk), increases voids. This appears to result in higher water-absorbing property, but it actually improves water resistance on cut surface under the present invention. Although the reason is not entirely clear, it is assumed that the organic compounds having the effect of inhibiting inter-fiber bond may be acting like sizing agents. Also, the main cause of water absorption into paper is pulp. Therefore, water absorption can be kept low because the density is lower, meaning that there is less pulp.

[3.3.3 Reference Test (3)—Smoothness of Base Material]

Reference test examples for evaluating the base material and its gloss, esthetically pleasing look and water resistance on cut surface are explained below. It should be noted, however, that the present invention is not at all limited to these examples. Unless otherwise specified, "parts" indicate "parts by weight" and "%" indicates "percent by weight."

The following tests were performed on the laminated sheets obtained by the reference test examples and reference comparative examples. The results are shown in Table 6.

<Surface Roughness>

Measurement was taken using a Surfcom 130A manufactured by Tokyo Seimitsu Co., Ltd., at a cutoff value of 0.8 mm, evaluation length of 8 mm, and measuring speed of 0.6 mm/sec. The smaller the value, the flatter the surface.

<Image Clarity (Esthetically Pleasing Look)>

Measurement was taken in the longitudinal direction of sheet at a reflection angle of 60° and comb width of 2.0 mm using an image clarity measuring machine ICM-1T manufactured by Suga Test Instruments Co., Ltd., in accordance with JIS K-7105.

<Gloss>

75° gloss was measured using a gloss meter GM-26PRO manufactured by Murakami Color Research Laboratory Co., Ltd., in accordance with ISO 8254-1.

<Water Resistance on Cut Surface (Resistance to Water Intrusion from Cut Surface)>

The level of water intrusion from the edges (cut surfaces) of the laminated sheet was evaluated based on the following method. Specifically, a cutout sample of 4×4 cm in size was immersed for 10 minutes in warm water that had been adjusted to 50° C. and colored in blue, and then dried for 10 minutes using a blow dryer set to 60° C. This process was repeated five times, after which the distance traveled by water inward from the edges was measured.

REFERENCE TEST EXAMPLE 21

(Production of Cast Coast Paper)

A coating solution with a solid content of 43% was prepared by adding together 70 parts of kaolin and 30 parts of light calcium carbonate as a pigment, 5 parts of styrene-butadiene latex and 5 parts of casein as a binder, and 2 parts of calcium stearate as a release agent. A high-grade paper with a basis weight of 139 g/m$^2$ was used as the coating base paper. The obtained coating solution was applied on the coating base paper using a roll coater until the dry solid content became 18 g/m$^2$, after which 10% aqueous solution of zinc formate was added as a solidifier to solidify the coating solution, and while the coating film was still wet it was pressed against a cast drum having a mirror surface that had been heated to 100° C. to dry the coating film and obtain a cast coat paper with a basis weight of 157 g/m$^2$. The obtained cast coat paper had a surface roughness Rz of 0.4 μm.

(Formation of Thermoplastic Resin Layers)

Onto the cast coat surface of the base material constituted by the aforementioned cast coat paper, polymethyl pentene (melting point 234° C., MFR 200 g/min, density 0.841 g/cm; TPX DX820 manufactured by Mitsui Chemicals, Inc.) was extruded and laminated using a T die at an extrusion temperature of 300° C., until the resin layer thickness became 20 μm, and immediately thereafter the molten resin and cast coat paper were pressed and pressure-bonded at a line pressure of 15 kgf/cm using a mirror-finished cooling roll and a nip roll having a hardness of 95 degrees.

Onto the other side of the cast coat paper, molten polymethyl pentene was extruded and laminated using a T die at an extrusion temperature of 300° C., until the resin layer thickness became 20 μm, and immediately thereafter the molten resin and cast coat paper were pressed and pressure-bonded at a line pressure of 15 kgf/cm using a matte-finished cooling roll and a nip roll having a hardness of 95 degrees, to obtain a base-material laminated sheet.

(Formation of Toner-Fixing Layers)

Next, 100 parts by weight of a cationic core-shell acrylic resin (density 34.5 percent by weight, core Tg 50° C., shell Tg 40° C., core/shell=50/50) were mixed with an antistatic agent so that the surface electrical resistivity became $1.0 \times 10^{10}$, after which the mixture was used to prepare a coating solution with a solid content of 10 percent by weight. The obtained coating solution was applied on both sides of the aforementioned base-material laminated sheet using a gravure coater until the dry solid content became 1 g/m$^2$, after which the coated layers were dried to form toner-fixing layers and thereby obtain a laminated sheet.

REFERENCE TEST EXAMPLE 22

(Production of Coat Paper)

Coating solution 1 with a solid content of 65% was obtained by adding 5 parts of styrene-butadiene copolymer latex, 10 parts of starch, and water, to 100 parts of heavy calcium carbonate slurry.

Also, a clay slurry with a concentration of 70% was prepared by mixing and dispersing 0.1 part of sodium polyacrylate as a dispersant, in 100 parts of kaolin as a pigment. Then, 12 parts of styrene-butadiene copolymer latex, 4 parts of starch, fluorescent dye, and water, were added to 50 parts of this clay slurry and 50 parts of heavy calcium carbonate slurry to obtain coating solution 2 with a solid content of 64%.

A high-grade paper with a basis weight of 123 g/m$^2$, containing 7 parts of light calcium carbonate as a filler and 100 parts of chemical pulp as a papermaking pulp, was used as the coating base paper.

Coating solution 1 was applied on both sides of the aforementioned base paper using a blade coater at a coating speed of 500 m/min until the coating weight on each side became 8 g/m$^2$, after which the paper was dried. Then, coating solution 2 was applied on both sides of the paper using a blade coater until the coating weight on each side became 9 g/m$^2$, after which the paper was dried. After drying, surface treatment was given using a super calendar to obtain a coat paper. The obtained coat paper had a surface roughness Rz of 0.6 μm.

A laminated sheet was obtained in the same manner as in Reference Test Example 21, except that the aforementioned coat paper was used as the base material.

REFERENCE TEST EXAMPLE 23

(Production of High-Grade Paper)

A high-grade paper with a basis weight of 157 g/m$^2$ and sizing degree of 40 seconds was obtained from 100 parts of chemical pulp as a papermaking pulp, 6 parts of light calcium carbonate as a filler, and 0.4 part of sizing agent as a chemical additive. The sizing degree was measured in accordance with JIS P-8122.

A laminated sheet was obtained in the same manner as in Reference Test Example 21, except that the aforementioned high-grade paper was calendared (temperature 60° C., 120 km/cm$^2$, 8 nips) and used as the base material. After calendaring, the obtained laminated sheet had a surface roughness Rz of 4.0 μm.

REFERENCE TEST EXAMPLE 24

(Production of Cast Coat Paper by Rewetting Method)

A pigment slurry with a concentration of 70% was prepared by mixing and dispersing 0.1 part of sodium polyacrylate as a dispersant, in a pigment mixture comprising 100 parts of a Brazilian kaolin (Capim DG manufactured by Rio Capim; grain size distribution by volume 0.4 to 4.2 μm: 71.7%) and 30 parts of a solid plastic pigment (V-1004 manufactured by Zeon Corporation; average grain size 0.32 μm, glass transition temperature 85° C.) as a pigment. Then, 14 parts of styrene-butadiene copolymer latex, 4 parts of starch, and water, were added to 100 parts of this pigment slurry to obtain a coating solution with a solid content of 60%. A high-grade paper with a basis weight of 116 g/m$^2$, containing 7 parts of light calcium carbonate as a filler and 100 parts of chemical pulp as a papermaking pulp, was used as the coating base paper.

The aforementioned coating solution was applied on both sides of the aforementioned base paper using a blade coater at a coating speed of 500 m/min until the coating weight on each side became 12 g/m$^2$, after which the paper was dried. After drying, surface treatment was given using a super calendar.

Next, the coat layer surface was rewetted using a rewetting solution (0.5% sodium hexametaphosphate), and then the paper was passed through a press nip comprising a forming roll and a cast drum to be finally pressed against the cast drum operating at a speed of 150 m/min and heated to a surface temperature of 115° C. to dry the coat layer. Thereafter, the paper was released from the cast drum using a strip-off roll to obtain a cast coat paper by the rewetting cast method. The obtained cast coat paper had a surface roughness Rz of 0.4 μm. A laminated sheet was obtained in the same manner as in Reference Test Example 21, except that the aforementioned cast coat paper was used as the base material.

REFERENCE TEST EXAMPLE 25

A laminated sheet was obtained in the same manner as in Reference Test Example 24, except that a cast coat paper produced by using a coating base paper containing 0.4 part of an agent inhibiting inter-fiber bond in pulp (KB-115 manufactured by Kao Corporation) was used as the base material. The obtained cast coat paper had a surface roughness Rz of 0.4 μm.

REFERENCE TEST EXAMPLE 26

A laminated sheet was obtained in the same manner as in Reference Test Example 24, except that, instead of the thermoplastic resin layers in Reference Test Example 25, a structure comprising three different layers was produced by means of co-extrusion lamination at 320° C. wherein the outermost layer was constituted by 100 parts by weight of a polymethyl pentene, the adhesive resin layer directly below the outermost layer was constituted by 100 parts by weight of a maleic acid anhydrate modified polyolefin resin (MFR 4.4 g/10 min, density 0.90 g/cm; Admer SE800 manufactured by Mitsui Chemicals, Inc.), and the layer on base material side was constituted by 100 parts by weight of a linear low-density polyethylene synthesized with single-site catalyst (melting point 122° C., MFR 8 g/10 min, density 0.907 g/cm; NH725N manufactured by Japan Polyethylene Corporation). The thicknesses of laminated resins were 15, 5 and 20 μm in the order of outermost layer, intermediate layer and layer on base material side.

Reference Comparative Example 21

A laminated sheet was obtained in the same manner as in Reference Test Example 21, except that the high-grade paper obtained by Reference Test Example 23 was used as the base material without calendaring. The high-grade paper had a surface roughness Rz of 9.0 μm.

nated sheet using a low-density base paper with bond inhibiting agent obtained by Reference Test Example 25, was better than the laminated sheet using a high-grade paper obtained by Reference Test Example 24, and (2) while both Reference Test Example 24 and Reference Test Example 22 used a high-grade paper as the base paper, the two examples had a different coat layer structure, where the coat structure using kaolin having a narrowly specified grain size distribution along with plastic pigments seems to have contributed to improved water resistance on cut surface. Although the result of Reference Test Example 23 shows that water resistance of high-grade paper can be improved using a strong sizing agent, the results of Reference Test Examples 25 and 26 indicate that a same level of water resistance on cut surface can be achieved

TABLE 6

| | | Reference Test Example 21 | Reference Test Example 22 | Reference Test Example 23 | Reference Test Example 24 | Reference Test Example 25 | Reference Test Example 26 | Reference Comparative Example 21 |
|---|---|---|---|---|---|---|---|---|
| Base material | Type | Cast coat paper (solidification method) | Coat paper | High-grade paper (with calendering) | Cast coat paper (rewetting method) | Cast coat paper (rewetting method) | Cast coat paper (rewetting method) | High-grade paper |
| | Surface roughness Rz | 0.4 μm | 0.6 μm | 0.4 μm | 0.4 μm | 0.4 μm | 0.4 μm | 9.0 μm |
| | Pulp-bond inhibiting agent (parts) | — | — | — | — | 0.4 (Kao KB-115) | 0.4 (Kao KB-115) | — |
| | Coating layer | Kaolin 70 parts Calcium carbonate 30 parts | Top layer Kaolin 50 parts + Calcium carbonate 50 parts Bottom layer Calcium carbonate 50 parts | — | Engineered kaolin 100 parts Plastic pigment 30 parts | Engineered kaolin 100 parts Plastic pigment 30 parts | Engineered kaolin 100 parts Plastic pigment 30 parts | — |
| Resin layer | Type | TPX | TPX | TPX | TPX | TPX | TPX Admer SS-LLDPE | TPX |
| Fixing layer | Binder | Cationic core-shell acrylic resin | Cationic core-shell acrylic resin | Cationic core-shell acrylic resin | Cationic core-shell acrylic resin | Cationic core-shell acrylic resin | Cationic core-shell acrylic resin | Cationic core-shell acrylic resin |
| | Image clarity | 85% | 80% | 55% | 85% | 85% | 88% | 21% |
| | Gloss | 95% | 90% | 90% | 95% | 95% | 97% | 90% |
| | Water resistance on cut surface | 15 mm | 15 mm | 0.5 mm | 5 mm | 0.5 mm | 0.5 mm | 0.5 mm |

Note 1:
TPX refers to "polymethyl pentene."
Note 2:
Admer refers to "maleic acid anhydrate modified polyolefin resin."
Note 3:
SS-LLDPE refers to "linear low-density polyethylene synthesized with single-site catalyst."

<Key Evaluations Based on Reference Test Examples>

Key items are pointed out among the results of reference test examples. It goes without saying that Table 6 does not list all results obtained.

The laminated sheet obtained by Reference Comparative Example 21 had high gloss but its image clarity was low and the appearance was esthetically not pleasing. As for image clarity, obviously the laminated sheet obtained by each reference test example had significantly higher image clarity than the one obtained by Reference Comparative Example 21. When Reference Test Example 23 and Reference Comparative Example 21 were compared, in particular, it is considered that the difference in surface roughness (Rz) contributed to the improvement in image clarity. Comparison of Reference Test Example 23 and other reference test examples reveals that decreasing surface roughness (Rz) would improve image quality. As for water resistance on cut surface, (1) the lamiby combining a low-density base paper using bond inhibiting agents and a coat layer in which kaolin having a narrowly specified grain size distribution is mixed with plastic pigments.

[4. Surface Characteristics of Laminated Sheet]

[4.1 Gloss]

A laminated sheet obtained in accordance with the present invention has a clear thermoplastic resin layer formed on the base material and therefore provides gloss. Among other papers, use of a coat paper, especially a cast coat paper, as the base material achieves a laminated sheet offering higher gloss and more esthetically pleasing look, as described in [3.3 Smooth Paper]. Here, high gloss indicates a condition where the 75° gloss as measured in accordance with ISO 8254-1 is 80% or above, or more preferably 90% or above. This condition is hereinafter referred to as "glossy." When a high-grade paper or any other paper is used as the base material, gloss is approx. 45%. A condition characterized by this level of gloss is referred to as "semi-glossy."

If a laminated sheet obtained in accordance with the present invention is used for recording by the electronic photograph printing method, use of a thermoplastic resin with a melting point of 180° C. or above as the outermost thermoplastic resin layer suppresses fusion with heating rolls and thereby reduces problems during the printing run. Also, surface properties do not drop after recording, and any drop in surface gloss can be kept to 5% or below. As a result, favorable surface texture can be maintained. In other words, this laminated sheet having a glossy surface texture can maintain gloss even after information is recorded on it by means of the electronic photograph printing method.

To obtain a glossy laminated sheet in accordance with the present invention, it is important to use, as the base material, a cast coat paper or any other paper that itself has smoothness and gloss, and also to ensure good adhesion between the laminated thermoplastic resin layers or between a thermoplastic resin layer and the base material, as well as flatness and smoothness inside the laminated sheet. Therefore, selecting a thermoplastic resin with a melting point of 180° C. or above for use as a thermoplastic resin constituting the outermost layer, or using a specific adhesive resin as the intermediate layer, achieves good adhesion between the outermost layer and the base material or other thermoplastic resin that comes in contact with the outermost layer, resulting in a smooth, flat laminated sheet. If polymethyl pentene is used as the aforementioned thermoplastic resin with a melting point of 180° C. or above, and a modified polyolefin resin is used as the aforementioned adhesive resin, bonding force easily changes due to heat because the adhesive resin is polyfunctionalized or crosslinked with metal, and consequently adhesive force increases due to rapid heating during lamination. If SS-LLDPE or other layer offering good adhesion with the base material is laminated immediately next to the base material, mutual adhesion between the base material and the thermoplastic resin layer on top can be further improved. Although SS-LLDPE is a resin that easily softens, it maintains high viscosity, although softening slightly, at the level of temperatures applied during printing by the electronic photograph method. Accordingly, air entering from the interface with the cooling roll during lamination can be pushed out. This prevents generation of craters and therefore contributes to improved gloss.

The impact the adhesion inside the laminated sheet has on gloss, etc., is evident from the fact that the gloss and image clarity of the laminated sheet obtained by Reference Test Example 26, without intermediate layer or layer on base paper material side, were higher than the values of laminated sheets obtained by other reference test examples, as explained in [3.4 Reference Test Example (3)—Smoothness of Base Material].

[4.2 Writability]

Under the electronic photograph printing method, latent image toner is transferred onto a toner-fixing layer to fix the toner by means of thermal fusion. Laminated sheets having a thermoplastic resin layer on their surface provide lower writability compared to normal papers. Particularly when they are used with a printer whose heating rolls are coated with silicone to prevent molten toner from attaching to the heating rolls, the silicone migrates to the paper surface and reduces writability after printing. As a means to solve this problem, a method to provide the surface with a coating layer containing fine inorganic powder is proposed, as described in Patent Literature 13 (Japanese Patent Laid-open No. 2002-91049) mentioned above. While this method improves toner-fixing property and writability after printing, however, addition of inorganic pigments, etc., makes fogging (a condition in which toner scatters over and stains white areas) occur easily.

On the other hand, the present invention mixes small inorganic filler grains into the toner-fixing layer to adjust the surface smoothness and surface resistivity to 200 seconds or more and within a range of $5 \times 10^8$ to $1 \times 10^{11}$, respectively. As a result, the obtained laminated sheet, while not providing high gloss, offers good toner-fixing property, suppresses fogging, and maintains good writability with a pencil, ballpoint pen, etc., after information is recorded on the sheet by means of the electronic photograph printing method.

A condition created by adding inorganic pigments to the toner-fixing layer by giving priority to writability, etc., is hereinafter referred to as "matte."

[4.2.1 Inorganic Filler]

As for inorganic fillers mixed into the toner-fixing layer, those with an average grain size of 2.5 μm or less can be used favorably. Use of these inorganic fillers gives good toner-fixing property and writability to the laminated sheet, thereby making the obtained laminated sheet suitable for various outdoor applications. More preferably, the average grain size should be 2.0 to 0.1 μm. If the grain size is too large, fogging may occur. If the grain size is too small, on the other hand, writability and other desired properties are reduced. For your reference, the average grain size was measured using a Coulter counter. Types of useful inorganic fillers include, but are not limited to, clay, silica, calcium carbonate and talc.

The blending ratio of inorganic filler and binder in the toner-fixing layer should desirably be 8:2 to 2:8 from the viewpoint of writability. If the percentage of binder content is less than 8:2, the intended effects decrease. If the percentage of binder content exceeds 2:8, on the other hand, the inorganic filler does not function because the most of it is buried in the binder. As a result, writability after printing drops.

[4.3 Surface Smoothness]

If a laminated sheet obtained in accordance with the present invention is used in connection with the electronic photograph printing method, it is desirable that the toner-fixing layer be very smooth and flat, regardless of whether the surface is matte with the layer containing inorganic pigments, or glossy or semi-glossy as explained above, and the smoothness as measured by the Oken method should be 200 seconds or more, or preferably 1,000 seconds or more. For your reference, Oken smoothness is measured in accordance with Japan TAPPI Paper Pulp Test Method No. 5-2. An overview of this measurement method is given below. First, a measurement head comprising nine concentric wheels with a width of 1±0.03 mm and having a total area of 808 mm² is pressed against the test piece with a load of 79.3 N. In the meantime, a water-column manometer having scales capable of reading Bekk smoothness levels of up to 3,000 seconds is connected at its top to the measurement head and a water-column type air regulator, so that readings (Bekk smoothness) can be taken by the water-column manometer by means of air of constant pressure supplied from the regulator. In other words, the smoother the test piece, the smaller the gap between the test piece and measurement head becomes and consequently less air escapes. As a result, the reading on the water-column manometer increases. Bekk smoothness indicates the time needed by a specific volume of atmospheric air to travel under a specific initial pressure difference between the test piece and ring-shaped plane that are being contacted with each other under specific conditions.

Toner fogging occurs more easily when surface irregularities are more prominent. This is probably because the projections on the sheet surface are pressed against the toner transfer drum or toner transfer belt more strongly than the depressions, thereby allowing toner to attach more to the projections. Particularly with a matte laminated sheet where inorganic fillers, etc., are added to the toner-fixing layer, the pointed edges of inorganic filler grains appear at the surface. The larger these pointed edges become, the more prominent the irregularities become and fogging occurs more easily as a result. For this reason, inorganic pigments should desirably have a small grain size.

Methods to smoothen the surface include calendaring the base material to increase smoothness, using a smooth paper such as a coat paper, and applying calendaring after a toner-fixing layer has been formed.

[4.4. Surface Electrical Resistivity]

Just like surface smoothness explained above, a desired range is also specified for surface electrical resistivity when a laminated sheet obtained in accordance with the present invention is used in connection with the electronic photograph printing method, regardless of whether the surface is matte with the toner-fixing layer containing inorganic pigments, or is glossy or semi-glossy. The surface electrical resistivity should be in a range of $5.0 \times 10^8$ to $5.0 \times 10^{11}$, or preferably in a range of $1.0 \times 10^9$ to $1.0 \times 10^{10}$. The higher the surface electrical resistivity, the more difficult it becomes for electricity to escape and the force that attracts toner to the sheet increases. Consequently, toner scatters and fogging occurs. If the surface electrical resistivity is too small, on the other hand, electricity escapes easily and the portion of toner that is supposed to be transferred to the image area is not transferred, thereby causing transfer problems. Methods to achieve the range of surface electrical resistivity recommended under the present invention include, among others, adding a known antistatic agent to the thermoplastic resin layer or toner-fixing layer, or coating an antistatic agent on the surface of the thermoplastic resin layer or toner-fixing layer. The type and content or coating weight of antistatic agent are not specifically limited, and can be adjusted as deemed appropriate so that a desired surface electrical resistivity is achieved. Such antistatic agent can be applied using any known application method.

[4.5 Reference Test (4)—Writability and Anti-Fogging Property]

Reference test examples performed in relation to writability and anti-fogging property are explained below. The results are shown in Table 7.

<Surface Electrical Resistivity>

Measurement was taken for a period of 60 seconds using a HIREST-UP MCP-HT450 manufactured by Mitsubishi Chemical Corporation in an environment of 23° C. and 50% RH with an impressed voltage of 500 V in accordance with the method specified by Mitsubishi Chemical (MCC-A).

<Evaluation of Writability After Printing>

An A3 sample was printed using a color laser beam printer DocuPrint C3530 manufactured by Fuji Xerox Co., Ltd., and text was written on the printed sample using a pencil (HB) and a ballpoint pen at a constant load and speed. The written text was visually evaluated based on the following criteria:

◯: No blurriness

Δ: Some blurriness x: The entire text was blurry.

<Anti-fogging Property>

Ten A3 samples were printed using a color laser beam printer DocuPrint C3530 manufactured by Fuji Xerox Co., Ltd., and the printed samples were visually evaluated to determine if fogging occurred.

REFERENCE TEST EXAMPLE 31

A molten polymethyl pentene (melting point 234° C.; TPX DX820 manufactured by Mitsui Chemicals, Inc.) was extruded and laminated on both sides of a high-grade paper with a basis weight of 157 g/m² using T dies at an extrusion temperature of 300° C., until the resin layer thickness became 20 μm, and immediately thereafter the molten resin and high-grade paper were pressed and pressure-bonded at a line pressure of 15 kgf/cm using a cooling roll and a nip roll having a hardness of 95 degrees, to obtain a base-material laminated sheet.

Next, 100 parts by weight of a cationic core-shell acrylic resin (concentration 34.5 percent by weight, core Tg 50° C., shell Tg 40° C., core/shell 50/50), and an antistatic agent, were mixed with an aqueous solution in which 80 parts by weight of clay with a grain size of 1 μm or below and 20 parts by weight of silica with an average grain size of 1.6 μm were dispersed, so that the surface electrical resistivity became $1.0 \times 10^{10}$, after which the mixture was used to prepare a coating solution with a solid content of 15 percent by weight. The obtained coating solution was applied on both sides of the aforementioned base-material laminated sheet using a gravure coater to 7 g/m² to form toner-fixing layers.

Reference Comparative Example 32

Toner-fixing layers were formed in the same manner as in Reference Test Example 31, except that the toner-fixing layers did not contain 80 parts by weight of clay with a grain size of 1 μm or below and 20 parts by weight of silica with an average grain size of 1.6 μm and a coating solution with a solid content of 7.5 percent by weight was prepared.

Reference Comparative Example 33

Toner-fixing layers were formed in the same manner as in Reference Test Example 31, except that the toner-fixing layers did not contain any antistatic agent.

TABLE 7

| | Reference Test Example 31 | Reference Comparative Example 32 | Reference Comparative Example 33 |
|---|---|---|---|
| Surface electrical resistivity (Ω/□) | $1.0 \times 10^{10}$ | $1.0 \times 10^{10}$ | $1.0 \times 10^{15}$ or more |
| Writability after printing (pencil/ballpoint pen) | ◯/◯ | X/Δ | ◯/◯ |
| Fogging | Did not occur. | Occurred. | Occurred. |

The laminated sheet obtained by Reference Comparative Example 32 exhibited poor writability after printing and also caused fogging, because the toner-fixing layers did not contain inorganic pigment. The laminated sheet obtained by Reference Comparative Example 33 had a high surface electrical resistivity of $1.0 \times 10^{15}$ or more and also caused fogging, because the toner-fixing layers did not contain antistatic agent.

EXAMPLES

The present invention is explained in details below using examples. Table 8 shows the results of the following evaluations performed on laminated sheets obtained by these examples.

<Surface Roughness of Base Material>

Measurement was taken on the base materials obtained by the examples and comparative examples, using a Surfcom 130A manufactured by Tokyo Seimitsu Co., Ltd., at a cutoff value of 0.8 mm, evaluation length of 8 mm, and measuring speed of 0.6 mm/sec.

<Evaluation of Film Formation Property on Toner-Fixing Layer>

A white cotton cloth was placed on the toner-fixing layer using a fastness tester (manufactured by Suga Test Instruments Co., Ltd.), and the cloth was moved back and forth 100 times with a load of 250 g/cm², after which the exterior was visually observed and evaluated based on the following criteria:

⊚: The toner-fixing layer did not detach at all (very good film formation property).
○: The toner-fixing layer hardly detached (good film formation property).
x: The toner-fixing layer detached (poor film formation property).

<Evaluation of Toner-Fixing Property>

Fifty A3 samples were printed continuously using a printer (Casio Speedia N5300) and a marking-off pin was moved at a speed of 10 cm/sec in a manner pressed against the printed area with a load of 40 g. Whether or not toner would detach was visually observed and evaluated based on the following criteria:

⊚: Toner did not detach at all.
○: Toner hardly detached.
x: Toner detached.

<Print Quality>

Fifty A3 samples were printed continuously using a printer (Casio Speedia N5300) and the printed image was visually observed and evaluated based on the following criteria:

⊚: The image was clear.
○: The image had some blurriness but there was no problem that would negatively affect practical application.
x: The image had notable blurriness.

<Evaluation of Toner Blocking Resistance>

Fifty A3 samples were printed continuously using a printer (Casio Speedia N5300) and the printed samples were separated by fanning. The level of toner separation was visually observed and evaluated based on the following criteria:

⊚: Blocking did not occur and toner did not separate.
○: Some blocking occurred, but toner did not separate.
x: Blocking occurred and toner separated.

<Sheet Transferability>

One thousand A4 samples were printed using a color laser beam printer Speedia N5300 manufactured by Casio Computer Co., Ltd., and the number of sheets that caused jamming or feed problems was counted and indicated based on the following criteria:

⊚: 5 sheets or less
○: 6 to 10 sheets
Δ: 11 to 20 sheets
x: 21 sheets or more

<Separation Between Thermoplastic Resin Layers>

A piece of double-sided adhesive tape was attached to a metal plate. Next, a sample of 1.5 cm in width and 7 cm in length was cut out, and the back side of the base material constituting the sample (side not laminated with any thermoplastic resin) was attached to the double-sided adhesive tape on the metal plate. Then, a piece of clear adhesive tape (trade name: Cellotape (registered trademark)) manufactured by Nichiban Co., Ltd. was firmly attached to the surface of the outermost thermoplastic resin layer, after which the clear adhesive tape was peeled off with a strong force to evaluate the result visually based on the following criteria:

⊚: No thermoplastic resin attached to the sticky surface of the tape, with the tape maintaining stickiness and the thermoplastic resin layers still firmly adhered to each other.
○: Some thermoplastic resin attached to the sticky surface of the tape. Although some thermoplastic resin remained on the base material and there was some separation between the thermoplastic resin layers, there was still strong resistance against separation and the thermoplastic resin layers were adhered to each other to a degree not causing any problem that would negatively affect practical application.
Δ: Some thermoplastic resin attached to the sticky surface of the tape. Some thermoplastic resin also remained on the base material and there was some separation between the thermoplastic resin layers. Although there was some resistance against separation, the thermoplastic resin layers were not fully adhered to each other and this created problems that would negatively affect practical application.
x: The thermoplastic resin layers separated from each other easily and did not remain adhered sufficiently.

<Adhesion with Base Material>

A test was conducted in the same manner as explained above, and the adhesion between the base material and the thermoplastic resin layer on top was visually evaluated based on the following criteria:

⊚: The two did not separate and maintained good adhesion.
○: The two separated slightly, but there was no problem that would negatively affect practical application.
Δ: The two easily separated and exhibited poor adhesion.
x: The two completely lost adhesion with each other.

<Change in Gloss After Printing>

One hundred A4 samples were printed using a color laser beam printer Speedia N5300 (the printer had a function that applies release oil to the heating rolls) manufactured by Casio Computer Co., Ltd., and 75° gloss was measured in white areas on each sample before and after printing using a gloss meter GM-26PRO manufactured by Murakami Color Research Laboratory Co., Ltd., in accordance with ISO 8254-1.

<Image Clarity>

The laminated sheet was measured before printing in the longitudinal direction of sheet at a reflection angle of 60° and comb width of 2.0 mm using an image clarity measuring machine ICM-IT manufactured by Suga Test Instruments Co., Ltd., in accordance with JIS K-7105.

<Water Resistance on Cut Surface>

The level of water intrusion from the edges (cut surfaces) of the laminated sheet was evaluated based on the following method. Specifically, a cutout sample of 4×4 cm in size was immersed for 10 minutes in warm water that had been adjusted to 50° C. and colored in blue, and then dried for 10 minutes using a blow dryer set to 60° C. This process was repeated five times, after which the distance traveled by water inward from the edges was measured.

<Evaluation of Writability After Printing>

An A3 sample was printed using a color laser beam printer DocuPrint C3530 manufactured by Fuji Xerox Co., Ltd., and text was written on the printed sample using a pencil (HB) and a ballpoint pen at a constant load and speed. The written text was visually evaluated based on the following criteria:

○: No blurriness
Δ: Some blurriness
x: The entire text was blurry.

<Fogging>

Ten A3 samples were printed using a color laser beam printer DocuPrint C3530 manufactured by Fuji Xerox Co., Ltd., and the printed samples were visually evaluated to determine if fogging occurred.

<Smoothness>

Oken smoothness was measured.

<Surface Electrical Resistivity>

Measurement was taken for a period of 60 seconds using a HIREST-UP MCP-HT450 manufactured by Mitsubishi Chemical Corporation in an environment of 23° C. and 50% RH with an impressed voltage of 500 V in accordance with the method specified by Mitsubishi Chemical (MCC-A).

<Blocking on White Paper>

Fifty sheets, each cut to a size of 10 cm×5 cm, were stacked and the stack was left for 24 hours in an environment of 40° C. and 85% RH in a condition receiving a load of 80 g/cm$^2$. Thereafter, the sheets were separated by manual fanning and occurrence of blocking was evaluated.

○: Blocking did not occur.
x: Blocking occurred.

Example 1

Onto both sides of the base material constituted by a high-grade paper (basis weight 157 g/m$^2$), 100 parts by weight of a polymethyl pentene (melting point 234° C.; TPX DX820 manufactured by Mitsui Chemicals, Inc.) were extruded and laminated using T dies at an extrusion temperature of 300° C., until the resin layer thickness became 20 μm, and immediately thereafter the molten resin and high-grade paper were pressed and pressure-bonded at a line pressure of 15 kgf/cm using a cooling roll and a nip roll having a hardness of 95 degrees, to obtain a base material sheet. Corona discharge treatment was given to the thermoplastic resin layer surface.

Next, 100 parts by weight of a cationic core-shell acrylic resin (concentration 34.5 percent by weight, core Tg 50° C., shell Tg 40° C., core/shell=50/50) as a binder for toner-fixing layer were mixed with an antistatic agent so that the surface electrical resistivity became $1.0 \times 10^{10}$, after which the mixture was used to prepare a coating solution with a solid content of 30 percent by weight. The obtained coating solution was applied on both sides of the aforementioned base material sheet using a gravure coater to 7 g/m$^2$ to form toner-fixing layers and thereby obtain a laminated sheet.

Example 2

A laminated sheet was obtained in the same manner as in Example 1, except that 20 parts by weight of a water dispersion of styrene-ester acrylate copolymer (concentration 37 percent by weight, Tg 102° C.) and 80 parts by weight of a water dispersion of styrene-acrylic copolymer (concentration 43 percent by weight, Tg 10° C.) were used as a binder for toner-fixing layer.

Example 3

A laminated sheet was obtained in the same manner as in Example 1, except that 30 parts by weight of a water dispersion of styrene-ester acrylate copolymer (concentration 37 percent by weight, Tg 102° C.) and 70 parts by weight of a water dispersion of styrene-acrylic copolymer (concentration 43 percent by weight, Tg 10° C.) were used as a binder for toner-fixing layer.

Example 4

A laminated sheet was obtained in the same manner as in Example 1, except that 50 parts by weight of a water dispersion of styrene-ester acrylate copolymer (concentration 37 percent by weight, Tg 102° C.) and 50 parts by weight of a water dispersion of styrene-acrylic copolymer (concentration 43 percent by weight, Tg 10° C.) were used as a binder for toner-fixing layer.

Example 5

A laminated sheet was obtained in the same manner as in Example 1, except that 100 parts by weight of a core-shell acrylic resin (concentration 33.5 percent by weight, core Tg 130° C., shell Tg 30° C., core/shell=40/60) were used as a binder for toner-fixing layer.

Example 6

A laminated sheet was obtained in the same manner as in Example 1, except that 30 parts by weight of a styrene-ester methacrylate copolymer resin (concentration 30 percent by weight, Tg 106° C.) and 70 parts by weight of a styrene-acrylic copolymer resin (concentration 25 percent by weight, Tg 45° C.) were used as a binder for toner-fixing layer.

Example 7

(Production of Cast Coat Paper by Solidification Method)

A coating solution with a solid content of 43% was prepared by adding together 70 parts of kaolin and 30 parts of light calcium carbonate as a pigment, 5 parts of styrene-butadiene latex and 5 parts of casein as a binder, and 2 parts of calcium stearate as a release agent. A high-grade paper with a basis weight of 139 g/m$^2$ was used as the coating base paper. The obtained coating solution was applied on the coating base paper using a roll coater until the dry solid content became 18 g/m$^2$, after which 10% aqueous solution of zinc formate was added as a solidifier to solidify the coating solution, and while the coating film was still wet it was pressed against a cast drum having a mirror surface that had been heated to 100° C. to dry the coating film and obtain a cast coat paper with a basis weight of 157 g/m$^2$. The obtained cast coat paper had a surface roughness Rz of 0.4 μm.

(Formation of Thermoplastic Resin Layers)

Onto the cast coat surface of the aforementioned cast coat paper constituting the base material, 100 parts by weight of a polymethyl pentene resin as the outermost layer, 100 parts by weight of a maleic acid anhydrate modified polyolefin (Admer SE800 manufactured by Mitsui Chemicals, Inc.) as the adhesive resin layer directly below the outermost layer (hereinafter referred to as "intermediate layer"), and 100 parts by weight of a linear low-density polyethylene synthesized with single-site catalyst (NH725N manufactured by Japan Polyethylene Corporation) as the layer on base material side, were co-extruded and laminated at 320° C. to make a structure comprising three different layers, and immediately thereafter these molten resins and cast coat paper were pressed and pressure-bonded at a line pressure of 15 kgf/cm using a mirror-finished cooling roll and a nip roll having a hardness of 95 degrees to obtain a base material sheet. The thicknesses of laminated resins were 15, 5 and 10 µm in the order of outermost layer, intermediate layer and layer on base material side. The other side of the cast coat paper was laminated in the same manner, except that a matte cooling roll was used. Corona discharge treatment was given to the thermoplastic resin layer surface.

(Formation of Toner-Fixing Layers)

Next, a binder for toner-fixing layer comprising 5 parts by weight of a water dispersion of styrene-ester acrylate copolymer (concentration 37 percent by weight, Tg 102° C.) and 95 parts by weight of a cationic core-shell acrylic resin (concentration 34.5 percent by weight, core Tg 50° C., shell Tg 40° C., core/shell=50/50) was mixed with an antistatic agent so that the surface electrical resistivity became $1.0 \times 10^{10}$, after which the mixture was used to prepare a coating solution with a solid content of 6 percent by weight. The obtained coating solution was applied on both sides of the aforementioned base material sheet using a gravure coater to 7 g/m² to form toner-fixing layers and thereby obtain a laminated sheet.

Example 8

5 parts by weight of a water dispersion of styrene-ester acrylate copolymer (concentration 37 percent by weight, Tg 102° C.) and 95 parts by weight of a styrene-acrylic copolymer resin (concentration 34.5 percent by weight, core Tg 50° C., shell Tg 40° C., core/shell=50/50) were used as a binder for toner-fixing layer, to which a polyalkyl siloxane with an average molecular weight of 700,000 was added to 1.5 percent by weight of the solid binder content, and then an antistatic agent was added so that the surface electrical resistivity became $1.0 \times 10^{10} \Omega/\square$, after which the mixture was used to prepare a coating solution with a solid content of 6 percent by weight. The obtained coating solution was applied on the thermoplastic resin layer surface of the aforementioned base material sheet using a gravure coater to a coating weight of 8 g/m² to obtain a laminated sheet.

Example 9

(Production of Cast Coat Paper by Rewetting Method)

A pigment slurry with a concentration of 70% was prepared by mixing and dispersing 0.1 part of sodium polyacrylate as a dispersant, in a pigment mixture comprising 100 parts of a Brazilian kaolin (Capim DG manufactured by Rio Capim; grain size distribution by volume 0.4 to 4.2 µm: 71.7%) and 30 parts of a solid plastic pigment (V-1004 manufactured by Zeon Corporation; average grain size 0.32 µm, glass transition temperature 85° C.) as a pigment. Then, 14 parts of styrene-butadiene copolymer latex, 4 parts of starch, and water, were added to 100 parts of this pigment slurry to obtain a coating solution with a solid content of 60%. A high-grade paper with a basis weight of 116 g/m², containing 0.4 part of an agent inhibiting inter-fiber bond in pulp (KB-115 manufactured by Kao Corporation), 7 parts of light calcium carbonate as a filler and 100 parts of chemical pulp as a papermaking pulp, was used as the coating base paper.

The aforementioned coating solution was applied on both sides of the aforementioned base paper using a blade coater at a coating speed of 500 m/min until the coating weight on each side became 12 g/m², after which the paper was dried. After drying, surface treatment was given using a super calender.

Next, the coat layer surface was rewetted using a rewetting solution (0.5% sodium hexametaphosphate), and then the paper was passed through a press nip comprising a forming roll and a cast drum to be finally pressed against the cast drum operating at a speed of 150 m/min and heated to a surface temperature of 115° C. to dry the coat layer. Thereafter, the paper was released from the cast drum using a strip-off roll to obtain a cast coat paper by the rewetting cast method. The obtained cast coat paper had a surface roughness Rz of 0.4 µm.

(Formation of Thermoplastic Resin Layers)

Onto the cast coat surface of the aforementioned rewet cast coat paper constituting the base material, 100 parts by weight of a polymethyl pentene resin as the outermost layer, 100 parts by weight of a maleic acid anhydrate modified polyolefin (Admer SE800 manufactured by Mitsui Chemicals, Inc.) as the adhesive resin layer directly below the outermost layer (hereinafter referred to as "intermediate layer"), and 100 parts by weight of a linear low-density polyethylene synthesized with single-site catalyst (NH725N manufactured by Japan Polyethylene Corporation) as the layer on base material side, were co-extruded and laminated at 320° C. to make a structure comprising three different layers, and immediately thereafter these molten resins and cast coat paper were pressed and pressure-bonded at a line pressure of 15 kgf/cm using a mirror-finished cooling roll and a nip roll having a hardness of 95 degrees to obtain a base material sheet. The thicknesses of laminated resins were 15, 5 and 10 µm in the order of outermost layer, intermediate layer and layer on base material side. The other side of the cast coat paper was laminated in the same manner, except that a matte cooling roll was used. Corona discharge treatment was given to the thermoplastic resin layer surface.

(Formation of Toner-Fixing Layers)

Next, 5 parts by weight of a water dispersion of styrene-ester acrylate copolymer (concentration 37 percent by weight, Tg 102° C.) and 95 parts by weight of a cationic core-shell acrylic resin (concentration 34.5 percent by weight, core Tg 50° C., shell Tg 40° C., core/shell 50/50) were used as a binder for toner-fixing layer, to which a polyalkyl siloxane with an average molecular weight of 700,000 was added to 0.75 percent by weight of the solid binder content, and then an antistatic agent was added so that the surface electrical resistivity became $1.0 \times 10^{10} \Omega/\square$, after which the mixture was used to prepare a coating solution with a solid content of 6 percent by weight. The obtained coating solution was applied on the thermoplastic resin layer surface of the aforementioned base material sheet using a gravure coater to a coating weight of 8 g/m² to obtain a laminated sheet.

Example 10

A laminated sheet was obtained in the same manner as in Example 1, except that an aqueous solution dispersing 80 parts by weight of clay with a grain size of 1 µm or less and 20 parts by weight of silica with an average grain size of 1.6 µm was used as a toner-fixing layer, and that 100 parts by weight of a cationic core-shell acrylic resin (concentration 34.5 percent by weight, core Tg 50° C., shell Tg 40° C., core/shell=50/

50) were used as a binder, to which a polyalkyl siloxane with an average molecular weight of 700,000 was added to 4.0 percent by weight of the solid binder content, and then an antistatic agent was added so that the surface electrical resistivity became $1.0 \times 10^{10}$, after which the mixture was used to prepare a coating solution with a solid content of 15 percent by weight.

Example 11

A laminated sheet was obtained in the same manner as in Example 10, except that a core-shell acrylic resin (concentration 33.5 percent by weight, core Tg 130° C., shell Tg 30° C., core/shell=40/60) was used as a binder for toner-fixing layer.

Comparative Example 1

A laminated sheet was obtained in the same manner as in Example 1, except that 100 parts by weight of a water dispersion of styrene-ester acrylate copolymer (concentration 37 percent by weight, Tg 102° C.) were used as a binder for toner-fixing layer.

Comparative Example 2

A laminated sheet was obtained in the same manner as in Example 3, except that 100 parts by weight of a water dispersion of styrene-acrylic copolymer (concentration 43 percent by weight, Tg 10° C.) were used as a binder for toner-fixing layer.

Comparative Example 3

A laminated sheet was obtained in the same manner as in Example 1, except that 30 parts by weight of a nonionic ester acrylate copolymer resin (concentration 40 percent by weight, Tg 49° C.) and 70 parts by weight of a water dispersion of styrene-acrylic copolymer (concentration 43 percent by weight, Tg 10° C.) were used as a binder for toner-fixing layer.

Comparative Example 4

A laminated sheet was obtained in the same manner as in Example 1, except that 30 parts by weight of a water dispersion of styrene-ester acrylate copolymer (concentration 37 percent by weight, Tg 102° C.) and 70 parts by weight of a cationic styrene-ester acrylate copolymer resin (concentration 22 percent by weight, Tg 80° C.) were used as a binder for toner-fixing layer.

Comparative Example 5

A laminated sheet was obtained in the same manner as in Example 1, except that no toner-fixing layer was provided.

TABLE 8

| | Constitution | | | Examples 1 | 2 | 3 | 4 | 5 | 6 |
|---|---|---|---|---|---|---|---|---|---|
| Toner-fixing layer | Binder | Glass transition temperature (° C.) | High temperature (A) | 50 (core) | 102 | 102 | 102 | 130 (core) | 106 |
| | | | Low temperature (B) | 40 (shell) | 10 | 10 | 10 | 30 (shell) | 45 |
| | | Blending ratio (A)/(B) | | 50/50 | 20/80 | 30/70 | 50/50 | 40/60 | 30/70 |
| | | Inorganic filler | | — | — | — | — | — | — |
| | | Silicone | | — | — | — | — | — | — |
| Thermoplastic resin layers (laminated layers) | | Outermost layer | | TPX 20 μm | TPX 20 μm | TPX 20 μm | TPX 20 μm | TPX 20 μm | TPX 20 μm |
| | | Intermediate layer | | — | — | — | — | — | — |
| | | Innermost layer | | — | — | — | — | — | — |
| Base paper material | | Type | | High-grade paper | High-grade paper | High-grade paper | High-grade paper | High-grade paper | High-grade paper |
| | | Bulk-increasing agent (contained in base paper) | | — | — | — | — | — | — |
| | | Cast coat layer: Engineered kaolin/plastic pigment | | — | — | — | — | — | — |
| Evaluation items | | Surface roughness (Rz, μm) | | 9 | 9 | 9 | 9 | 9 | 9 |
| | | Film formation property | | ◎ | ◎ | ◎ | ○ | ○ | ○ |
| | | Toner-fixing property | | ◎ | ○ | ○ | ○ | ◎ | ○ |
| | | Print quality | | ◎ | ◎ | ◎ | ◎ | ◎ | ○ |
| | | Toner blocking resistance | | X | X | ○ | ◎ | ◎ | ○ |
| | | Blocking on white paper | | ○ | ○ | ○ | ○ | ○ | ○ |
| | | Sheet transferability | | ◎ | ◎ | ◎ | ◎ | ◎ | ◎ |
| | | Separation between resin layers | | — | — | — | — | — | — |
| | | Adhesion with base paper material | | ○ | ○ | ○ | ○ | ○ | ○ |
| | | White paper gloss | Before printing | 45 | 45 | 45 | 45 | 45 | 45 |
| | | | After printing | — | — | — | — | — | — |
| | | Image clarity | Before printing | — | — | — | — | — | — |
| | | Water resistance on cut surface | | 0.5 mm | 0.5 mm | 0.5 mm | 0.5 mm | 0.5 mm | 0.5 mm |
| | | Writability after printing (pencil/ballpoint pen) | | X/Δ | X/Δ | X/Δ | X/Δ | X/Δ | X/Δ |
| | | Fogging | | Did not occur. | Did not occur. | Did not occur. | Did not occur. | Did not occur. | Did not occur. |
| | | Oken smoothness (top/back) | | 220/220 | 220/220 | 220/220 | 220/220 | 220/220 | 220/220 |
| | | Surface electrical resistivity | | $10 \times 10^{10}$ | $10 \times 10^{10}$ | $10 \times 10^{10}$ | $10 \times 10^{10}$ | $10 \times 10^{10}$ | $10 \times 10^{10}$ |

TABLE 8-continued

| | Constitution | | | Examples 7 | Examples 8 | Examples 9 | Examples 10 | Examples 11 | Comparative examples 1 |
|---|---|---|---|---|---|---|---|---|---|
| Toner-fixing layer | Binder | Glass transition temperature (° C.) | High temperature (A) | 102 | 102 | 102 | 50 (core) | 130 (core) | 102 |
| | | | Low temperature (B) | 50 (core) 40 (shell) | 50 (core) 40 (shell) | 50 (core) 40 (shell) | 40 (shell) | 30 (shell) | — |
| | | Blending ratio (A)/(B) | | 5/95 | 5/95 | 5/95 | 50/50 | 40/60 | 100/0 |
| | | Inorganic filler | | — | — | — | 50 | 50 | — |
| | | Silicone | | — | 1.5 | 0.75 | 4.0 | 4.0 | — |
| Thermoplastic resin layers (laminated layers) | Outermost layer | | | TPX 15 μm | TPX 15 μm | TPX 15 μm | TPX 20 μm | TPX 20 μm | TPX 20 μm |
| | Intermediate layer | | | Modified polyolefin 5 μm | Modified polyolefin 5 μm | Modified polyolefin 5 μm | — | — | — |
| | Innermost layer | | | SS-LDPE 10 μm | SS-LDPE 10 μm | SS-LDPE 10 μm | — | — | — |
| Base paper material | Type | | | Cast coat paper by solidification method | Cast coat paper by solidification method | Cast coat paper by rewetting method | High-grade paper | High-grade paper | High-grade paper |
| | Bulk-increasing agent (contained in base paper) | | | — | — | 0.4 | — | — | — |
| | Cast coat layer: Engineered kaolin/plastic pigment | | | — | — | 100/30 | — | — | — |
| Evaluation items | Surface roughness (Rz, μm) | | | 0.4 | 0.4 | 0.4 | 9 | 9 | 9 |
| | Film formation property | | | ◎ | ◎ | ◎ | ◎ | ○ | X |
| | Toner-fixing property | | | ◎ | ◎ | ◎ | ○ | ○ | — |
| | Print quality | | | ◎ | ◎ | ◎ | ○ | ○ | — |
| | Toner blocking resistance | | | Δ | Δ | Δ | X | ○ | — |
| | Blocking on white paper | | | ○ | ○ | ○ | ○ | ○ | — |
| | Sheet transferability | | | Δ | ◎ | ◎ | ◎ | ◎ | — |
| | Separation between resin layers | | | ○ | ○ | ○ | — | — | — |
| | Adhesion with base paper material | | | ○ | ○ | ○ | ○ | ○ | ○ |
| | White paper gloss | Before printing | | 95.5 | 95.6 | 95.6 | 9.8 | 9.8 | — |
| | | After printing | | 87.4 | 94.4 | 92.7 | — | — | — |
| | Image clarity | Before printing | | 85 | 85 | 85 | — | — | — |
| | Water resistance on cut surface | | | 15 mm | 15 mm | 0.5 mm | 0.5 mm | 0.5 mm | — |
| | Writability after printing (pencil/ballpoint pen) | | | X/X | X/X | X/X | ○/○ | ○/○ | — |
| | Fogging | | | Did not occur. | Did not occur. | Did not occur. | Did not occur. | Did not occur. | — |
| | Oken smoothness (top/back) | | | 40000/70 | 40000/70 | 40000/70 | 220/220 | 220/220 | — |
| | Surface electrical resistivity | | | $10 \times 10^{10}$ | $10 \times 10^{10}$ | $10 \times 10^{10}$ | $10 \times 10^{10}$ | $10 \times 10^{10}$ | — |

| | Constitution | | | Comparative examples 2 | Comparative examples 3 | Comparative examples 4 | Comparative examples 5 |
|---|---|---|---|---|---|---|---|
| Toner-fixing layer | Binder | Glass transition temperature (° C.) | High temperature (A) | — | 49 | 102 | — |
| | | | Low temperature (B) | 10 | 10 | 80 | — |
| | | Blending ratio (A)/(B) | | 0/100 | 30/70 | 30/70 | — |
| | | Inorganic filler | | — | — | — | — |
| | | Silicone | | — | — | — | — |
| Thermoplastic resin layers (laminated layers) | Outermost layer | | | TPX 20 μm | TPX 20 μm | TPX 20 μm | TPX 20 μm |
| | Intermediate layer | | | — | — | — | — |
| | Innermost layer | | | — | — | — | — |
| Base paper material | Type | | | High-grade paper | High-grade paper | High-grade paper | High-grade paper |
| | Bulk-increasing agent (contained in base paper) | | | — | — | — | — |
| | Cast coat layer: Engineered kaolin/plastic pigment | | | — | — | — | — |
| Evaluation items | Surface roughness (Rz, μm) | | | 9 | 9 | 9 | 9 |
| | Film formation property | | | ◎ | ◎ | X | — |
| | Toner-fixing property | | | ◎ | ○ | ○ | X |
| | Print quality | | | ◎ | ◎ | ○ | Δ |
| | Toner blocking resistance | | | X | X | ◎ | ○ |
| | Blocking on white paper | | | X | X | ○ | ○ |
| | Sheet transferability | | | ◎ | ◎ | ◎ | ◎ |
| | Separation between resin layers | | | — | — | — | — |
| | Adhesion with base paper material | | | ○ | ○ | ○ | ○ |
| | White paper gloss | Before printing | | 45 | 45 | 45 | 45 |
| | | After printing | | — | — | — | — |

TABLE 8-continued

|  |  |  |  |  |
|---|---|---|---|---|
| Image clarity Before printing | — | — | — | — |
| Water resistance on cut surface | 0.5 mm | 0.5 mm | 0.5 mm | 0.5 mm |
| Writability after printing (pencil/ballpoint pen) | X/Δ | X/Δ | X/Δ | X/Δ |
| Fogging | Did not occur. | Did not occur. | Did not occur. | Occurred |
| Oken smoothness (top/back) | 220/220 | 220/220 | 220/220 | 220/220 |
| Surface electrical resistivity | $10 \times 10^{10}$ | $10 \times 10^{10}$ | $10 \times 10^{10}$ | $1.0 \times 10^{15}$ or more |

Consideration of Examples and Comparative Examples

The test data obtained through these examples and comparative examples suggest various things. Only key items are described below, and what can be learned from these data are not at all limited to those stated hereunder.

(1) It is clear that the laminated sheets obtained by these examples provide good film formation property on their toner-fixing layers. In particular, comparison of Comparative Example 4 and Example 3 or Example 6 indicates that the poor result of Comparative Example 3 is due to the high glass transition temperature, or 80° C., of hydrophilic macromolecular substance (B) of lower glass transition temperature.

(2) It is clear that the laminated sheets obtained by these examples provide good toner-fixing property. In particular, favorable results were achieved from Examples 1, 5, 7, 8 and 9 in which the binder for toner-fixing layer combined a high-Tg binder and a low-Tg binder in a core-shell structure. On the other hand, the laminated sheet obtained by Comparative Example 5 had poor toner-fixing property, because there was no toner-fixing layer and the thermoplastic resin layer was printed directly.

(3) It is clear that the laminated sheets obtained by these examples provide good print quality. On the other hand, the laminated sheet obtained by Comparative Example 5 had poor print quality, because the thermoplastic resin layer was printed directly.

(4) The laminated sheets obtained by Examples 3 to 9 and 11 provide good toner blocking resistance. When these examples are examined together with other examples and Comparative Examples 2 to 4, it is assumed that the reason for their good toner blocking resistance is due to the use of high-Tg hydrophilic macromolecular substance (A).

The slightly lower toner blocking resistance of laminated sheets obtained by Examples 7 to 9 indicates that adding 5 percent by weight of a Tg 102° C. binder to the binder for toner-fixing layer used in Example 1 does not make sufficient improvement. Comparison of Examples 2 and 3 clearly suggests that it is desirable to adjust the content of high-Tg hydrophilic macromolecular substance (A) to at least 30 percent by weight.

(5) The laminated sheets obtained by these examples provide excellent white preservation property because they did not cause blocking on white paper. On the other hand, the laminated sheets obtained by Comparative Examples 2 and 3 caused blocking while they were kept in white paper state, suggesting a problem with the low-Tg binder. The reason for suppressed blocking on white paper is assumed to be the use of core-shell binders in the case of Example 1, and addition of an inorganic filler in the case of Example 10.

(6) As for sheet transferability, attention is drawn to the laminated sheets with a high glossy surface finish obtained by Examples 7 to 9. It is well known that a glossy finish is generally associated with a high friction coefficient, which increases the risk of multiple sheets being fed together. Comparison of Example 7 with Examples 8 and 9 clearly indicates that adding silicone to the toner-fixing layer would reduce the friction coefficient and thereby achieve good transferability. The laminated sheets obtained by Examples 1 to 6 and Comparative Examples 2 to 4 have a semi-glossy surface finish with a surface gloss of 45%. Since their surface is rough with fine irregularities, these sheets can be transferred favorably without adding silicone. Furthermore in regards to the laminated sheets obtained by Examples 10 and 11, both of which are given a matte surface finish through addition of an inorganic filler, their higher friction coefficients indicate that adding silicone would also be effective in these conditions.

(7) These examples can provide laminated sheets with a variety of surface properties including a glossy finish of 85% or higher gloss, semi-glossy finish with a gloss range of approx. 40 to 60%, and matte finish of lower gloss, all based on surface gloss measured before printing. In particular, the laminated sheets obtained by Examples 7 to 9 use a cast coat paper as the base material and therefore provide a high gloss of 85% even after printing. These laminated sheets also demonstrate excellent image quality.

(8) As for water resistance on cut surface, comparison of Examples 7 to 9 offering high gloss reveals that a particularly excellent level of water resistance was achieved by the laminated sheet obtained by Example 9, which used a cast coat paper as the base material where such cast coat paper was produced by providing on a low-density base paper containing an agent inhibiting inter-fiber bond in pulp, a coat layer containing specific engineered kaolin and plastic pigment by means of the rewetting cast coat method. Other examples using a high-grade paper as the base material also showed good results, probably because a large volume of sizing agent was used to achieve strong sizing property.

(9) As for writability after printing, the laminated sheets obtained by Examples 10 and 11, in which an inorganic filler was added to the toner-fixing layer, exhibited good results.

(10) In summary, the present invention can provide a variety of laminated sheets having different finishes from matte to glossy, suitable as recording sheets for electronic photograph printing. In particular, these sheets provide excellent surface water resistance and water resistance on cut surface, and can therefore be used in outdoor locations and other areas where the sheet comes in contact with water. It is also possible to write on these sheets after printing, if necessary. Although full-color printing increases the sheet weight, use of a base material with a smaller specific gravity can reduce the weight and also improve handling ease.

The invention claimed is:

1. A laminated sheet characterized by comprising a base material made of paper, one or more thermoplastic resin layer(s) provided on one side or both sides of said base material, a toner-fixing layer further provided thereon, wherein an outermost thermoplastic resin layer is constituted by a thermoplastic resin having a melting point of 180° C. or above, two or more hydrophilic macromolecular substances, each having a different glass transition temperature, are used as binders constituting said toner-fixing layer, and at least a hydrophilic macromolecular substance (A) having a glass transition temperature of 50° C. or above and a hydrophilic macromolecular substance (B) having a glass transition temperature of 50° C. or below are contained as said hydrophilic macromolecular substances.

2. The laminated sheet according to claim 1, characterized in that the hydrophilic macromolecular substance (A) is a hydrophilic macromolecular substance having a glass transition temperature of 80° C. or above.

3. The laminated sheet according to claim 1 or 2, characterized in that the hydrophilic macromolecular substances (A) and (B) are contained at the ratio of (A)/(B) =80/20 to 30/70.

4. The laminated sheet according to claim 1, characterized in that the hydrophilic macromolecular substances (A) and (B) are acrylic polymers.

5. The laminated sheet according to claim 4, characterized in that the hydrophilic macromolecular substances (A) and (B) are acrylic polymers, and said acrylic polymer has a core-shell structure wherein the hydrophilic macromolecular substances (A) and (B) constitute a core part and a shell part, respectively.

6. The laminated sheet according to claim 1, characterized in that the thermoplastic resin with a melting point of 180° C. or above is a polymethyl pentene.

7. The laminated sheet according to claim 1, characterized in that the one or more thermoplastic resin layers are two or more layers, and a thermoplastic resin layer contacting the base material is constituted of a straight-chain low-density polyethylene synthesized with a single-site catalyst.

8. The laminated sheet according to claim 1, characterized in that the one or more thermoplastic resin layers are two or more layers, and a thermoplastic resin layer contacting the base material is constituted of at least a straight-chain low-density polyethylene synthesized with a single-site catalyst, and a layer next to said layer constituted of a modified polyolefin, ionomer or a mixture of the foregoing with a thermoplastic resin having a melting point of 180° C. or above.

9. The laminated sheet according to claim 8, characterized in that the modified polyolefin is a maleic acid anhydride modified polyolefin.

10. The laminated sheet according to claim 1, characterized in that the base material has a surface roughness Rz of 5.0 µm or below.

11. The laminated sheet according to claim 10, characterized in that the base material is a cast coat paper having a cast coat layer mainly constituted of a pigment and an adhesive and provided on a base paper.

12. The laminated sheet according to claim 11, characterized in that the cast coat paper is made by using a heated mirror-finished surface to pressure-bond the cast coat layer provided on the base paper while the cast coat layer is still wet and drying the pressure-bonded cast coat layer, wherein said cast coat layer contains at least 50 parts by weight of kaolin relative to 100 parts by weight of inorganic pigments where the kaolin has a grain size distribution account for 65% by volume or more of grains having a size in a range of 0.4 to 4.2 µm, and also contains a plastic pigment.

13. The laminated sheet according to claim 12, characterized in that the base paper contains an organic compound having an effect of inhibiting inter-fiber bond in pulp.

14. The laminated sheet according to claim 1, characterized in that the toner-fixing layer contains a macromolecular silicone with an average molecular weight of 600,000 to 900,000.

15. The laminated sheet according to claim 1, characterized in that its 75° gloss under ISO (8254-1) is 80% or above and image clarity measured in accordance with JIS K-7105 is 50% or above.

16. The laminated sheet according to claim 1, characterized in that the toner-fixing layer contains an inorganic filler, and a laminated sheet surface has a smoothness of 200 seconds or more and surface electrical resistivity of $5 \times 10^8$ to $1 \times 10^{11}$.

17. The laminated sheet according to claim 1, characterized in that the laminated sheet is a recording sheet for electronic photograph printing.

18. A laminated sheet comprising:
a base material made of paper;
one or more thermoplastic resin layer(s) including an outermost thermoplastic resin layer and being provided on one side or both sides of said base material by co-extension, wherein the outermost thermoplastic resin layer is constituted by a thermoplastic resin having a melting point of 180° C. or above; and
a toner-fixing layer provided on the thermoplastic resin layer(s) and including a binder which comprises two or more hydrophilic macromolecular substances, each having a different glass transition temperature, said hydrophilic macromolecular substances comprising at least a hydrophilic macromolecular substance (A) having a glass transition temperature of 50° C. or above and a hydrophilic macromolecular substance (B) having a glass transition temperature of 50° C. or below.

19. A laminated sheet comprising a base material made of paper, one or more thermoplastic resin layer(s) provided on one side or both sides of said base material, a toner-fixing layer further provided thereon, wherein an outermost thermoplastic resin layer is constituted by a thermoplastic resin having a melting point of 180° C. or above, two or more hydrophilic macromolecular substances, each having a different glass transition temperature, are used as binders constituting said toner-fixing layer, and at least a hydrophilic macromolecular substance (A) having a glass transition temperature of 50° C. or above and a hydrophilic macromolecular substance (B) having a glass transition temperature of 50° C. or below are contained as said hydrophilic macromolecular substances, said one or more thermoplastic resin layer(s) and said outermost thermoplastic resin layer being laminated on the base material by co-extrusion.

* * * * *

UNITED STATES PATENT AND TRADEMARK OFFICE
CERTIFICATE OF CORRECTION

PATENT NO.       : 7,749,591 B2
APPLICATION NO.  : 11/576242
DATED            : July 6, 2010
INVENTOR(S)      : Masaaki Fukunaga et al.

It is certified that error appears in the above-identified patent and that said Letters Patent is hereby corrected as shown below:

Column 11, line 60; Change "prop" to --Drop--.

Column 12, line 45; Change "polylamide" to --polyamide--.

Column 14, line 21; Change "amid," to --amide,--.

Column 21, line 46; Change "Note)" to --(Note)--.

Column 28, line 66; Change "calendar," to --calender,--.

Column 29, line 1; Change "calendar" to --calender--.

Column 29, line 7; Change "calendaring" to --calendering--.

Column 32, line 17; Change "calendaring, soft calendaring," to --calendering, soft calendering,--.

Column 32, line 53; Change "calendar" to --calender--.

Column 32, line 54; Change "calendar" to --calender--.

Column 33, line 10; Change "microcrystallin" to --microcrystalline--.

Column 33, line 43; Change "calendaring" to --calendering--.

Column 35, line 52; Change "calendar" to --calender--.

Column 36, line 3; Change "calendared" to --calendered--.

Column 36, line 4-5; Change "calendaring" to --calendering,--.

Column 36, line 31; Change "calendar." to --calender.--.

Column 37, line 14; Change "calendaring." to --calendering.--.

Column 41, line 13; Change "calendaring" to --calendering--.

Column 41, line 15; Change "calendaring" to --calendering--.

Column 42, line 24; Change "core/shell 50/50)," to --core/shell=50/50),--.

Column 44, line 60; Change "ICM-IT" to --ICM-1T--.

Column 48, line 7; Change "calendar." to --calender.--.

Column 48, line 47; Change "core/shell 50/50)" to --core/shell=50/50)--.

Signed and Sealed this
Twenty-fifth Day of January, 2011

David J. Kappos
*Director of the United States Patent and Trademark Office*

Column 56, line 31-32; In Claim 18, change "material by co-extension," to --material,--.